US012568427B2

(12) United States Patent
Akl et al.

(10) Patent No.: US 12,568,427 B2
(45) Date of Patent: Mar. 3, 2026

(54) HIERARCHICAL PHYSICAL CELL IDENTIFIER ADDRESSING

(71) Applicant: QUALCOMM Incorporated, San Diego, CA (US)

(72) Inventors: Naeem Akl, Bridgewater, NJ (US); Karl Georg Hampel, Jersey City, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/489,225

(22) Filed: Oct. 18, 2023

(65) Prior Publication Data

US 2025/0133484 A1     Apr. 24, 2025

(51) Int. Cl.
*H04W 48/16* (2009.01)
*H04W 48/08* (2009.01)
*H04W 56/00* (2009.01)

(52) U.S. Cl.
CPC ........... *H04W 48/16* (2013.01); *H04W 48/08* (2013.01); *H04W 56/001* (2013.01)

(58) Field of Classification Search
CPC .... H04W 48/16; H04W 48/08; H04W 56/001

USPC ........................................................ 455/414.1
See application file for complete search history.

(56) References Cited

U.S. PATENT DOCUMENTS

| | | | | |
|---|---|---|---|---|
| 9,332,446 | B2 * | 5/2016 | Nagaraja ............... | H04W 24/02 |
| 11,424,889 | B2 * | 8/2022 | Berger .............. | H04L 27/26136 |
| 2013/0215744 | A1 * | 8/2013 | Haswarey ............. | H04W 24/04 |
| | | | | 370/235 |
| 2020/0351055 | A1 * | 11/2020 | Manolakos ............ | H04B 7/088 |
| 2021/0100062 | A1 * | 4/2021 | Joseph ................. | H04W 76/27 |
| 2025/0254524 | A1 * | 8/2025 | Wang .................... | H04W 12/10 |

* cited by examiner

*Primary Examiner* — Juan A Torres
(74) *Attorney, Agent, or Firm* — Holland & Hart LLP

(57) ABSTRACT

Methods, systems, and devices for wireless communication are described. A user equipment (UE) may receive a first set of one or more signals and a second set of one or more signals, the first set of one or more signals indicating a first code value associated with a physical cell identifier (PCI), and the second set of one or more signals indicating a second code value associated with the PCI. The UE may receive, based at least in part on the first code value and the second code value, a third set of one or more signals indicating a third code value associated with the PCI. The UE may communicate one or more wireless communications with a first cell according to a physical cell identity of the first cell, where the physical cell identity is encoded by the first code value, the second code value, and the third code value.

30 Claims, 17 Drawing Sheets

Network Entity 105-a Coverage

Network Entity 105-b Coverage

Network Entity 105-c Coverage

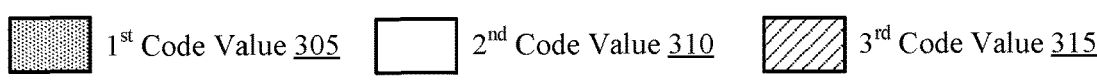
1<sup>st</sup> Code Value 305          2<sup>nd</sup> Code Value 310          3<sup>rd</sup> Code Value 315
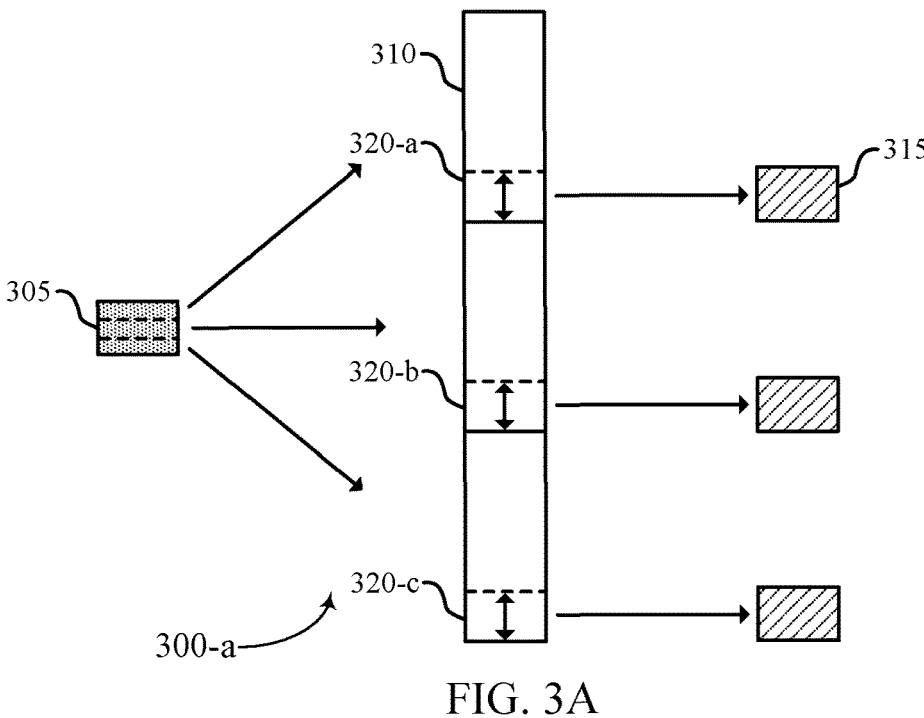
FIG. 3A
FIG. 3B 130     105                          115

Network
Entity

Transceiver                    Antenna 1310                           1315

Communications
Manager

Memory

Code

1330

1320                           1325

1340

Processor

1335

1305

1300

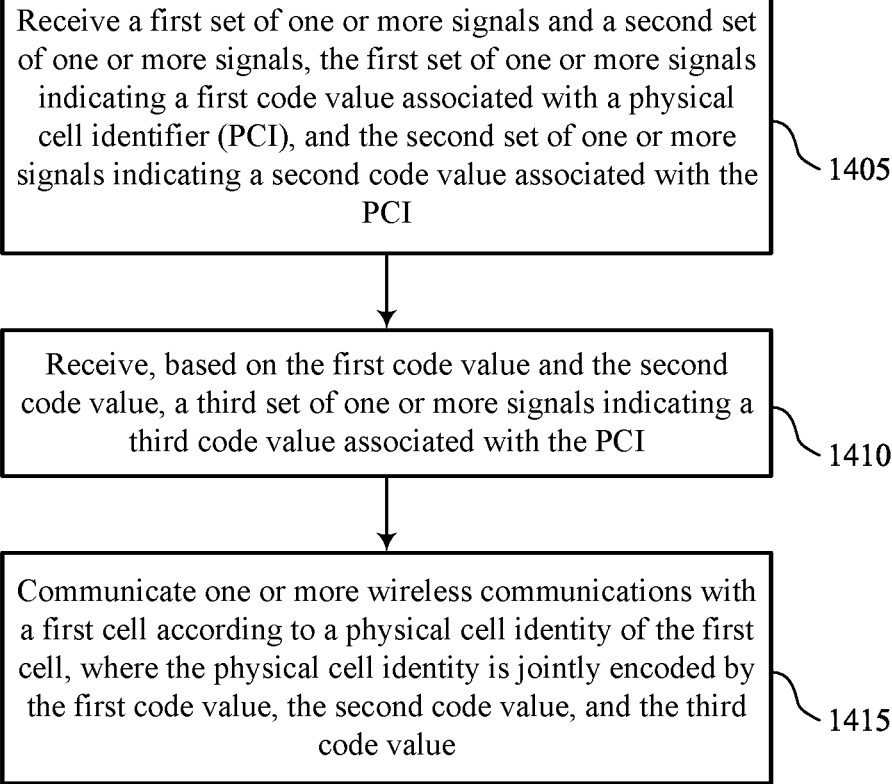

Receive a first set of one or more signals and a second set of one or more signals, the first set of one or more signals indicating a first code value associated with a physical cell identifier (PCI), and the second set of one or more signals indicating a second code value associated with the PCI

1405

Receive, based on the first code value and the second code value, a third set of one or more signals indicating a third code value associated with the PCI

1410

Communicate one or more wireless communications with a first cell according to a physical cell identity of the first cell, where the physical cell identity is jointly encoded by the first code value, the second code value, and the third code value

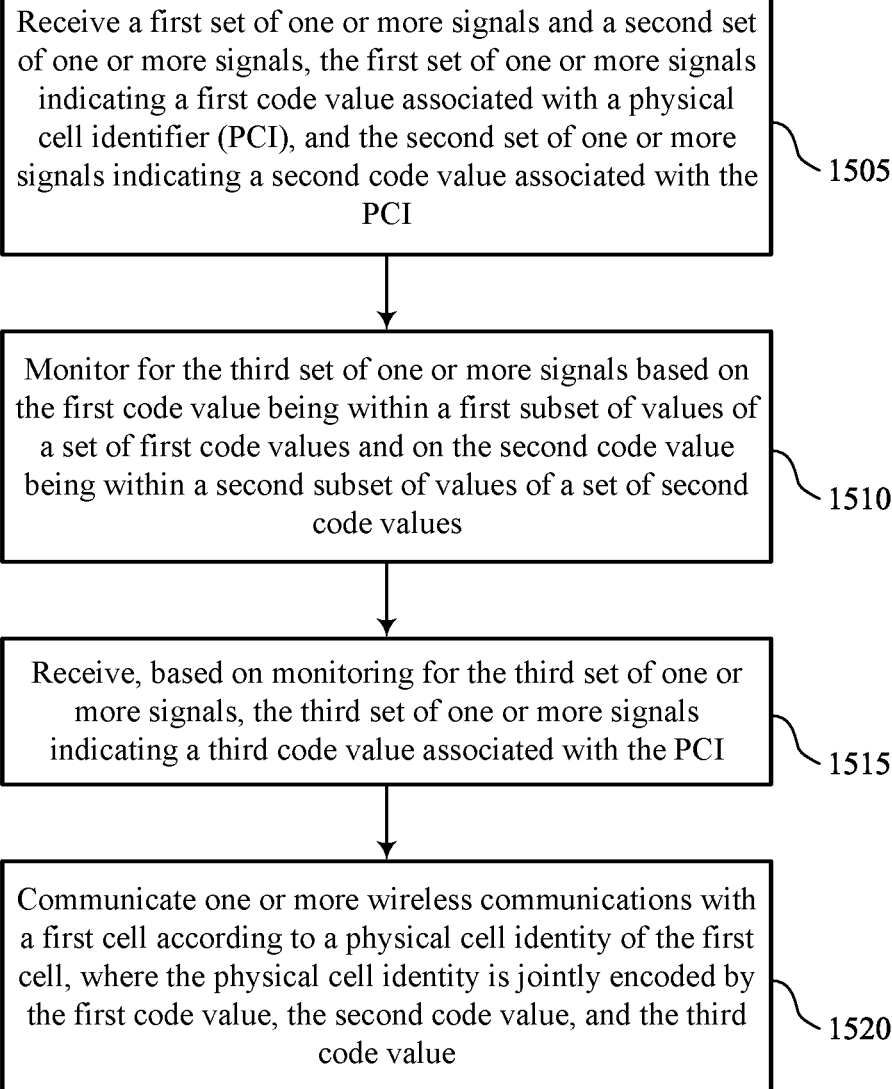

Receive a first set of one or more signals and a second set of one or more signals, the first set of one or more signals indicating a first code value associated with a physical cell identifier (PCI), and the second set of one or more signals indicating a second code value associated with the PCI

1505

Monitor for the third set of one or more signals based on the first code value being within a first subset of values of a set of first code values and on the second code value being within a second subset of values of a set of second code values

1510

Receive, based on monitoring for the third set of one or more signals, the third set of one or more signals indicating a third code value associated with the PCI

1515

Communicate one or more wireless communications with a first cell according to a physical cell identity of the first cell, where the physical cell identity is jointly encoded by the first code value, the second code value, and the third code value

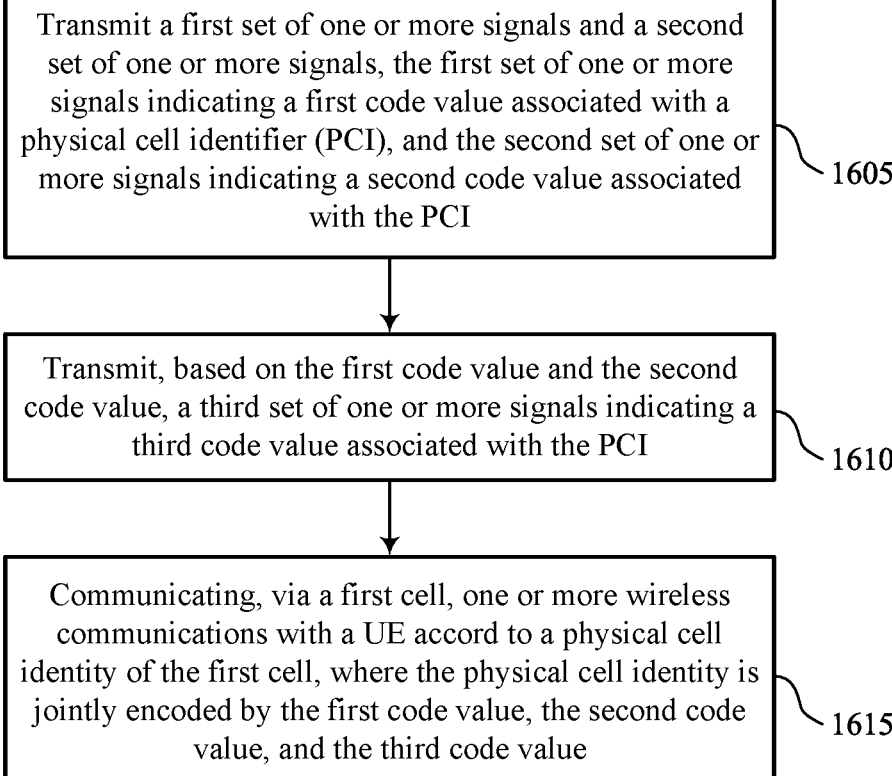

Transmit a first set of one or more signals and a second set of one or more signals, the first set of one or more signals indicating a first code value associated with a physical cell identifier (PCI), and the second set of one or more signals indicating a second code value associated with the PCI

1605

Transmit, based on the first code value and the second code value, a third set of one or more signals indicating a third code value associated with the PCI

1610

Communicating, via a first cell, one or more wireless communications with a UE accord to a physical cell identity of the first cell, where the physical cell identity is jointly encoded by the first code value, the second code value, and the third code value

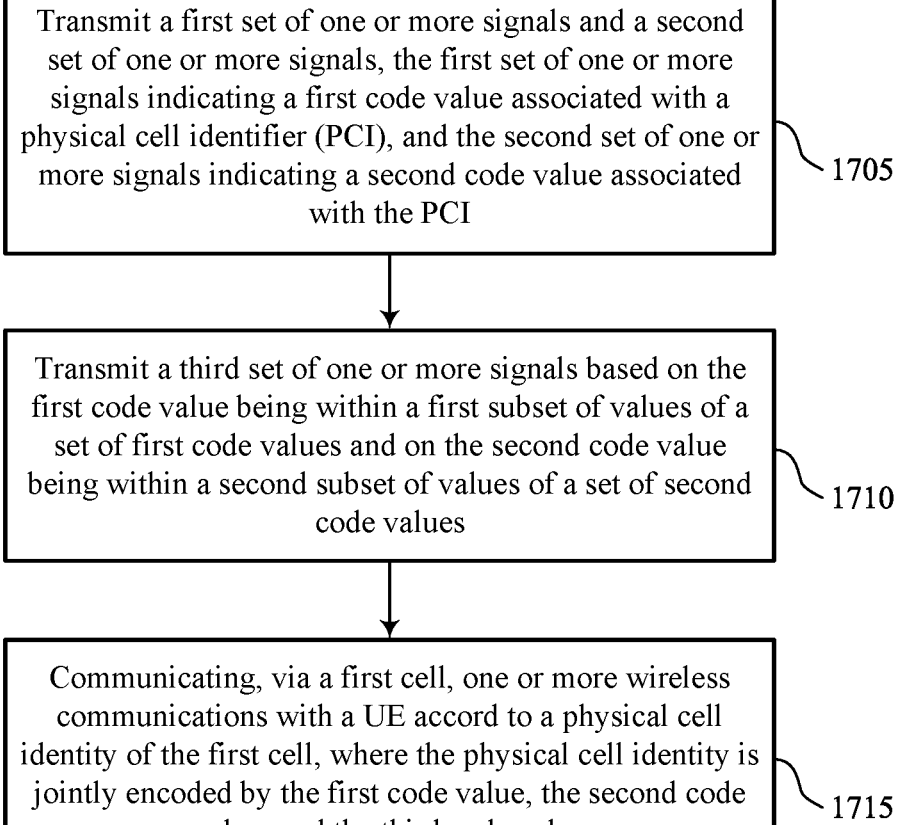

Transmit a first set of one or more signals and a second set of one or more signals, the first set of one or more signals indicating a first code value associated with a physical cell identifier (PCI), and the second set of one or more signals indicating a second code value associated with the PCI

1705

Transmit a third set of one or more signals based on the first code value being within a first subset of values of a set of first code values and on the second code value being within a second subset of values of a set of second code values

1710

Communicating, via a first cell, one or more wireless communications with a UE accord to a physical cell identity of the first cell, where the physical cell identity is jointly encoded by the first code value, the second code value, and the third code value

HIERARCHICAL PHYSICAL CELL IDENTIFIER ADDRESSING

FIELD OF TECHNOLOGY

The following relates to wireless communication, including hierarchical physical cell identifier addressing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some cases, a UE may communicate with a network entity via one or more cells. A UE may distinguish one cell from another based on their respective physical cell identifiers (PCIs).

SUMMARY

The described techniques relate to improved methods, systems, devices, and apparatuses that support hierarchical physical cell identifier addressing. In some examples, a UE may determine a first code value and a second code value associated with determination of a PCI of a cell by receiving a first set of signals and a second set of signals. In accordance with examples as described herein, the UE may receive a third set of signals (e.g., a tertiary synchronization signal) used to determine the PCI based on the first code value, the second code value, or both. For example, a subset of the values for the first code and the second code may be associated with an additional signal. In some examples, the first code and the second code may indicate assistance information for receiving the additional signal. Accordingly, the UE may determine a PCI value based on the first code, the second code, and the third code. This may reduce the likelihood of neighboring cells having a same PCI value, thereby reducing uncertainty in receiving, transmitting, and handover procedures by the UE.

A method for wireless communication by a UE is described. The method may include receiving a first set of one or more signals and a second set of one or more signals, the first set of one or more signals indicating a first code value associated with a PCI, and the second set of one or more signals indicating a second code value associated with the PCI, receiving, based on the first code value and the second code value, a third set of one or more signals indicating a third code value associated with the PCI, and communicating one or more wireless communications with a first cell according to a physical cell identity of the first cell, where the physical cell identity is jointly encoded by the first code value, the second code value, and the third code value.

A UE for wireless communication is described. The UE may include one or more memories storing processor executable code, and one or more processors coupled with the one or more memories. The one or more processors may individually or collectively operable to execute the code to cause the UE to receive a first set of one or more signals and a second set of one or more signals, the first set of one or more signals indicating a first code value associated with a PCI, and the second set of one or more signals indicating a second code value associated with the PCI, receive, based on the first code value and the second code value, a third set of one or more signals indicating a third code value associated with the PCI, and communicate one or more wireless communications with a first cell according to a physical cell identity of the first cell, where the physical cell identity is jointly encoded by the first code value, the second code value, and the third code value.

Another UE for wireless communication is described. The UE may include means for receiving a first set of one or more signals and a second set of one or more signals, the first set of one or more signals indicating a first code value associated with a PCI, and the second set of one or more signals indicating a second code value associated with the PCI, means for receiving, based on the first code value and the second code value, a third set of one or more signals indicating a third code value associated with the PCI, and means for communicating one or more wireless communications with a first cell according to a physical cell identity of the first cell, where the physical cell identity is jointly encoded by the first code value, the second code value, and the third code value.

A non-transitory computer-readable medium storing code for wireless communication is described. The code may include instructions executable by a processor to receive a first set of one or more signals and a second set of one or more signals, the first set of one or more signals indicating a first code value associated with a PCI, and the second set of one or more signals indicating a second code value associated with the PCI, receive, based on the first code value and the second code value, a third set of one or more signals indicating a third code value associated with the PCI, and communicate one or more wireless communications with a first cell according to a physical cell identity of the first cell, where the physical cell identity is jointly encoded by the first code value, the second code value, and the third code value.

In some examples of the method, UEs, and non-transitory computer-readable medium described herein, receiving the third set of one or more signals may include operations, features, means, or instructions for monitoring for the third set of one or more signals based on the first code value being within a first subset of values of a set of first code values and on the second code value being within a second subset of values of a set of second code values.

In some examples of the method, UEs, and non-transitory computer-readable medium described herein, the first set of one or more signals and the second set of one or more signals may be received from a second cell different from the first cell. In some examples of the method, UEs, and non-transitory computer-readable medium described herein, the third set of one or more signals may be received from the first cell.

Some examples of the method, UEs, and non-transitory computer-readable medium described herein may further include operations, features, means, or instructions for receiving, from the second cell, a message including assistance information for reception of the third set of one or more signals from the first cell, where receiving the third set of one or more signals from the first cell may be based on the assistance information.

In some examples of the method, UEs, and non-transitory computer-readable medium described herein, the first set of one or more signals and the second set of one or more signals may be received via a first frequency within a frequency bandwidth indicated by a synchronization raster and the third set of one or more signals may be received via a second frequency within the frequency bandwidth indicated by the synchronization raster.

Some examples of the method, UEs, and non-transitory computer-readable medium described herein may further include operations, features, means, or instructions for receiving, from the second cell, system information associated with the first cell.

Some examples of the method, UEs, and non-transitory computer-readable medium described herein may further include operations, features, means, or instructions for receiving a fourth set of one or more signals indicating a fourth code value associated with the PCI based on the first code value, the second code value, and the third code value, where communicating the one or more wireless communications with the first cell according to the physical cell identity of the first cell may be further based on the fourth code value.

In some examples of the method, UEs, and non-transitory computer-readable medium described herein, the fourth set of one or more signals may be received based on the third code value being within a third subset of values of a set of third code values. In some examples of the method, UEs, and non-transitory computer-readable medium described herein, the first set of one or more signals, the second set of one or more signals, or both, indicate assistance information for reception of the third set of one or more signals.

In some examples of the method, UEs, and non-transitory computer-readable medium described herein, the assistance information indicates a frequency location for reception of the third set of one or more signals based on a frequency offset from a center frequency associated with reception of the first set of one or more signals and the second set of one or more signals.

In some examples of the method, UEs, and non-transitory computer-readable medium described herein, the first set of one or more signals and the second set of one or more signals may be received via a first frequency within a frequency bandwidth indicated by a synchronization raster, and the third set of one or more signals may be received via a second frequency outside of the frequency bandwidth indicated by the synchronization raster based on the assistance information.

Some examples of the method, UEs, and non-transitory computer-readable medium described herein may further include operations, features, means, or instructions for decoding a master information block associated with communications with the first cell based on receiving the first code value, the second code value, and the third code value, where communicating one or more wireless communications with a first cell may be based on successfully decoding the master information block.

Some examples of the method, UEs, and non-transitory computer-readable medium described herein may further include operations, features, means, or instructions for decoding a master information block associated with communications with the first cell based on receiving the first code value and the second code value, where receiving the third set of one or more signals may be based on successfully decoding the master information block.

Some examples of the method, UEs, and non-transitory computer-readable medium described herein may further include operations, features, means, or instructions for receiving, form the first cell, a demodulation reference signal based on the first code value, the second code value, and the third code value.

A method for wireless communication by a network entity is described. The method may include transmitting a first set of one or more signals and a second set of one or more signals, the first set of one or more signals indicating a first code value associated with a PCI, and the second set of one or more signals indicating a second code value associated with the PCI, transmitting, based on the first code value and the second code value, a third set of one or more signals indicating a third code value associated with the PCI, and communicating, via a first cell, one or more wireless communications with a UE according to a physical cell identity of the first cell, where the physical cell identity is jointly encoded by the first code value, the second code value, and the third code value.

A network entity for wireless communication is described. The network entity may include one or more memories storing processor executable code, and one or more processors coupled with the one or more memories. The one or more processors may individually or collectively operable to execute the code to cause the network entity to transmit a first set of one or more signals and a second set of one or more signals, the first set of one or more signals indicating a first code value associated with a PCI, and the second set of one or more signals indicating a second code value associated with the PCI, transmit, based on the first code value and the second code value, a third set of one or more signals indicating a third code value associated with the PCI, and communicating, via a first cell, one or more wireless communications with a UE accord to a physical cell identity of the first cell, where the physical cell identity is jointly encoded by the first code value, the second code value, and the third code value.

Another network entity for wireless communication is described. The network entity may include means for transmitting a first set of one or more signals and a second set of one or more signals, the first set of one or more signals indicating a first code value associated with a PCI, and the second set of one or more signals indicating a second code value associated with the PCI, means for transmitting, based on the first code value and the second code value, a third set of one or more signals indicating a third code value associated with the PCI, and means for communicating, via a first cell, one or more wireless communications with a UE according to a physical cell identity of the first cell, where the physical cell identity is jointly encoded by the first code value, the second code value, and the third code value.

A non-transitory computer-readable medium storing code for wireless communication is described. The code may include instructions executable by a processor to transmit a first set of one or more signals and a second set of one or more signals, the first set of one or more signals indicating a first code value associated with a PCI, and the second set of one or more signals indicating a second code value associated with the PCI, transmit, based on the first code value and the second code value, a third set of one or more signals indicating a third code value associated with the PCI, and communicating, via a first cell, one or more wireless communications with a UE accord to a physical cell identity of the first cell, where the physical cell identity is jointly encoded by the first code value, the second code value, and the third code value.

Some examples of the method, network entities, and non-transitory computer-readable medium described herein may further include operations, features, means, or instructions for transmitting the third set of one or more signals based on the first code value being within a first subset of values of a set of first code values and on the second code value being within a second subset of values of a set of second code values.

In some examples of the method, network entities, and non-transitory computer-readable medium described herein, the first set of one or more signals and the second set of one or more signals may be transmitted via a second cell different from the first cell. In some examples of the method, network entities, and non-transitory computer-readable medium described herein, the third set of one or more signals may be transmitted via the first cell.

Some examples of the method, network entities, and non-transitory computer-readable medium described herein may further include operations, features, means, or instructions for transmitting, via the second cell, a message including assistance information for reception of the third set of one or more signals from the first cell, where transmitting the third set of one or more signals from the first cell may be in accordance with the assistance information.

In some examples of the method, network entities, and non-transitory computer-readable medium described herein, the first set of one or more signals and the second set of one or more signals may be transmitted via a first frequency within a frequency bandwidth indicated by a synchronization raster and the third set of one or more signals may be transmitted via a second frequency within the frequency bandwidth indicated by the synchronization raster.

Some examples of the method, network entities, and non-transitory computer-readable medium described herein may further include operations, features, means, or instructions for transmitting, via the second cell, system information associated with the first cell.

Some examples of the method, network entities, and non-transitory computer-readable medium described herein may further include operations, features, means, or instructions for transmitting a fourth set of one or more signals indicating a fourth code value associated with the PCI based on the first code value, the second code value, and the third code value, where communicating the one or more wireless communications with the first cell according to the physical cell identity of the first cell may be further based on the fourth code value.

In some examples of the method, network entities, and non-transitory computer-readable medium described herein, the fourth set of one or more signals further may be transmitted based on the third code value being within a third subset of values of a set of third code values.

In some examples of the method, network entities, and non-transitory computer-readable medium described herein, the first set of one or more signals, the second set of one or more signals, or both, indicate assistance information for reception of the third set of one or more signals.

In some examples of the method, network entities, and non-transitory computer-readable medium described herein, the assistance information indicates a frequency location for reception of the third set of one or more signals based on a frequency offset from a center frequency associated with reception of the first set of one or more signals and the second set of one or more signals.

In some examples of the method, network entities, and non-transitory computer-readable medium described herein, the first set of one or more signals and the second set of one or more signals may be transmitted via a first frequency within a frequency bandwidth indicated by a synchronization raster, and the third set of one or more signals may be transmitted via a second frequency outside of the frequency bandwidth indicated by the synchronization raster.

Some examples of the method, network entities, and non-transitory computer-readable medium described herein may further include operations, features, means, or instructions for transmitting, via the first cell, a demodulation reference signal based on the first code value, the second code value, and the third code value.

BRIEF DESCRIPTION OF THE DRAWINGS

FIGS. 3A and 3B show examples of code diagrams that support hierarchical physical cell identifier addressing in accordance with one or more aspects of the present disclosure.

FIGS. 14 through 17 show flowcharts illustrating methods that support hierarchical physical cell identifier addressing in accordance with one or more aspects of the present disclosure.

DETAILED DESCRIPTION

In some wireless communications systems, a UE may communicate with a network entity via one or more cells. To initiate communications with a cell, a UE may receive a primary synchronization signal (PSS) and a secondary synchronization signal (SSS) to determine a PCI associated with the cell. For instance, the UE may extract a first code from the PSS and a second code from the SSS, and the UE may determine the PCI based on the first code and the second code. In some cases, however, multiple neighboring cells may be associated with a same PCI value, which may create uncertainty at the UE during receiving, transmitting, or handover operations. Increasing the range of possible PCI values by increasing the range of values for the first code or the second code may reduce the likelihood of neighboring cells having a same PCI value. However, increasing the range may also proportionally increase a quantity of operations (e.g., computations, decoding, searches) performed by the UE to determine the PCI value based on the PSS and the SSS. As such, techniques for expanding the range of possible PCI values, without greatly impacting the quantity of operations performed by the UE, may be desired.

In accordance with examples as described herein, the UE may receive an additional signal (e.g., a tertiary synchronization signal) used in calculation of the PCI. In some examples, a subset of the values for the first code and the second code may be associated with an additional signal. For example, the UE may receive the additional signal based on the values for the first code and the second code, and the UE may extract a third code from the additional signal. In some examples, the first code and the second code may indicate assistance information for receiving the additional signal. For example, a macro cell may transmit a PSS and an SSS, which may indicate assistance information for the additional signal to be transmitted by one or more cells within a coverage area of the macro cell. Accordingly, the UE may determine a PCI value based on the first code, the second code, and the third code. As such, the likelihood of neighboring cells having a same PCI value may be decreased, thereby reducing uncertainty in receiving, transmitting, and handover procedures by the UE. Further, this may increase the quantity of possible PCI values exponentially with respect to a quantity of potential values for the third code, while increasing the quantity of operations performed by the UE linearly, thereby achieving a more efficient expansion of the possible PCI values.

Aspects of the disclosure are initially described in the context of wireless communications systems. Aspects of the disclosure are additionally described in the context of diagrams and process flows. Aspects of the disclosure are further illustrated by and described with reference to apparatus diagrams, system diagrams, and flowcharts that relate to hierarchical physical cell identifier addressing.

Figure 1:
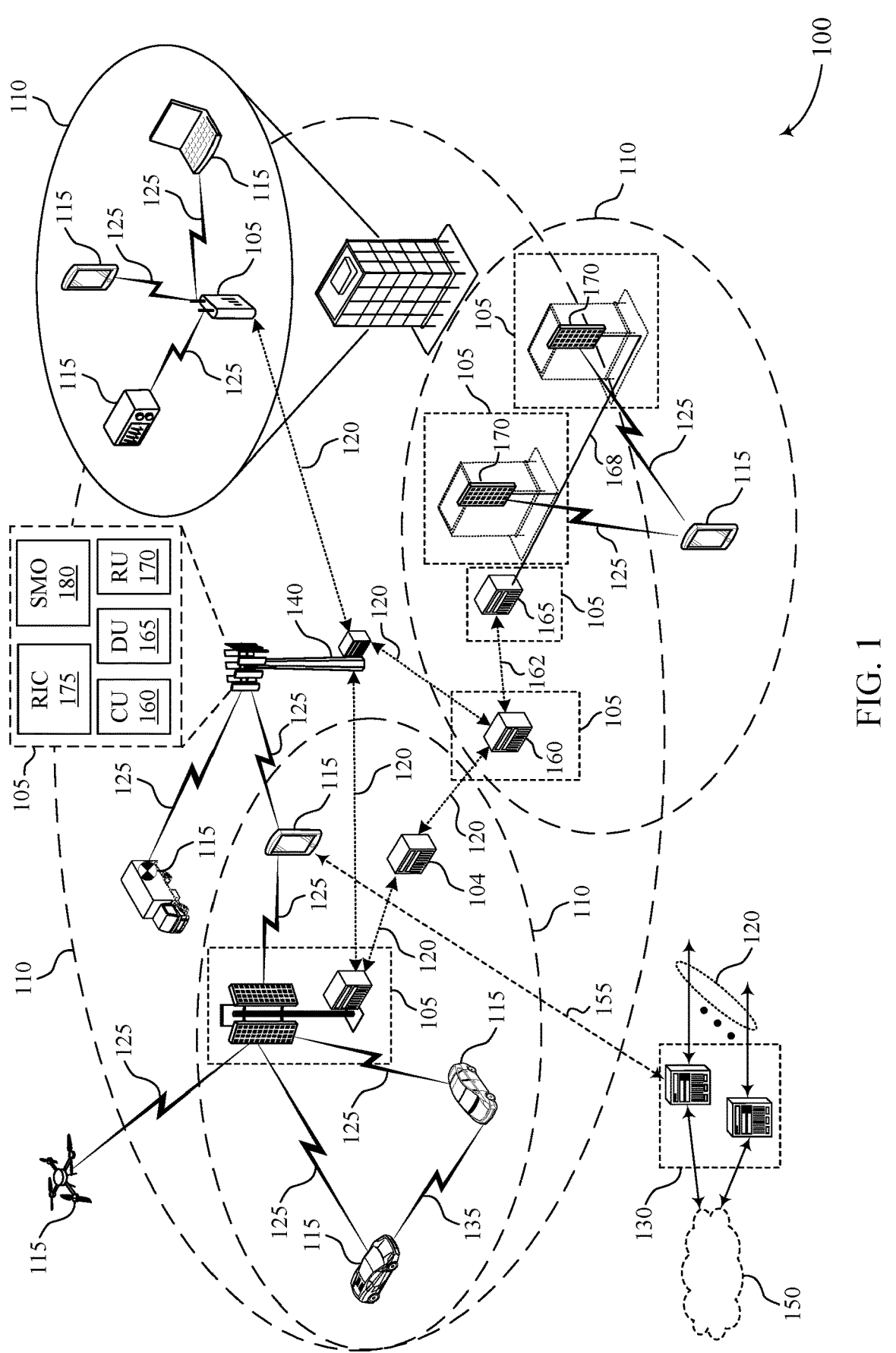
FIG. 1 shows an example of a wireless communications system that supports hierarchical physical cell identifier addressing in accordance with one or more aspects of the present disclosure.

FIG. 1 shows an example of a wireless communications system 100 that supports hierarchical physical cell identifier addressing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-NB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1. F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support hierarchical physical cell identifier addressing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, for a UE 115 to initiate communications with a cell (e.g., a cell of a network entity 105), a UE 115 may receive a PSS and a secondary synchronization signal SSS to determine a PCI associated with the cell. In some cases, however, multiple neighboring cells may be associated with a same PCI value, which may create uncertainty at the UE 115 during receiving, transmitting, or handover operations. Increasing the range of possible PCI values may reduce the likelihood of neighboring cells having a same PCI value. However, increasing the range may also proportionally increase a quantity of operations (e.g., computations, decoding, searches) performed by the UE 115 to determine the PCI value based on the PSS and the SSS. As such, techniques for expanding the range of possible PCI values, without greatly impacting the quantity of operations performed by the UE 115, may be desired.

In accordance with examples as described herein, the UE 115 may receive an additional signal (e.g., a tertiary synchronization signal) used in calculation of the PCI. In some examples, a subset of the values for a first code from a PSS and a second code from an SSS may be associated with an additional signal for reception of a third code. For example, the UE 115 may receive the additional signal based on the values for the first code and the second code, and the UE 115 may extract the third code from the additional signal. In some examples, the first code and the second code may indicate assistance information for receiving the additional signal. For example, a macro cell may transmit a PSS and an SSS, which may indicate assistance information for the additional signal to be transmitted by one or more cells (e.g., small cells) within a coverage area of the macro cell. Accordingly, the UE 115 may determine a PCI value based on the first code, the second code, and the third code. As such, the likelihood of neighboring cells having a same PCI value may be decreased, thereby reducing uncertainty in receiving, transmitting, and handover procedures by the UE 115. Further, this may increase the quantity of possible PCI values exponentially with respect to a quantity of potential values for the third code, while increasing the quantity of operations performed by the UE 115 linearly, thereby achieving a more efficient expansion of the possible PCI values.

Figure 2:
FIG. 2 shows an example of a wireless communications system that supports hierarchical physical cell identifier addressing in accordance with one or more aspects of the present disclosure.
Figure 2:
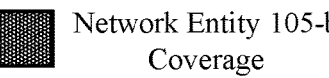
Figure 2:
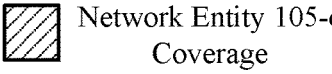
Figure 2:
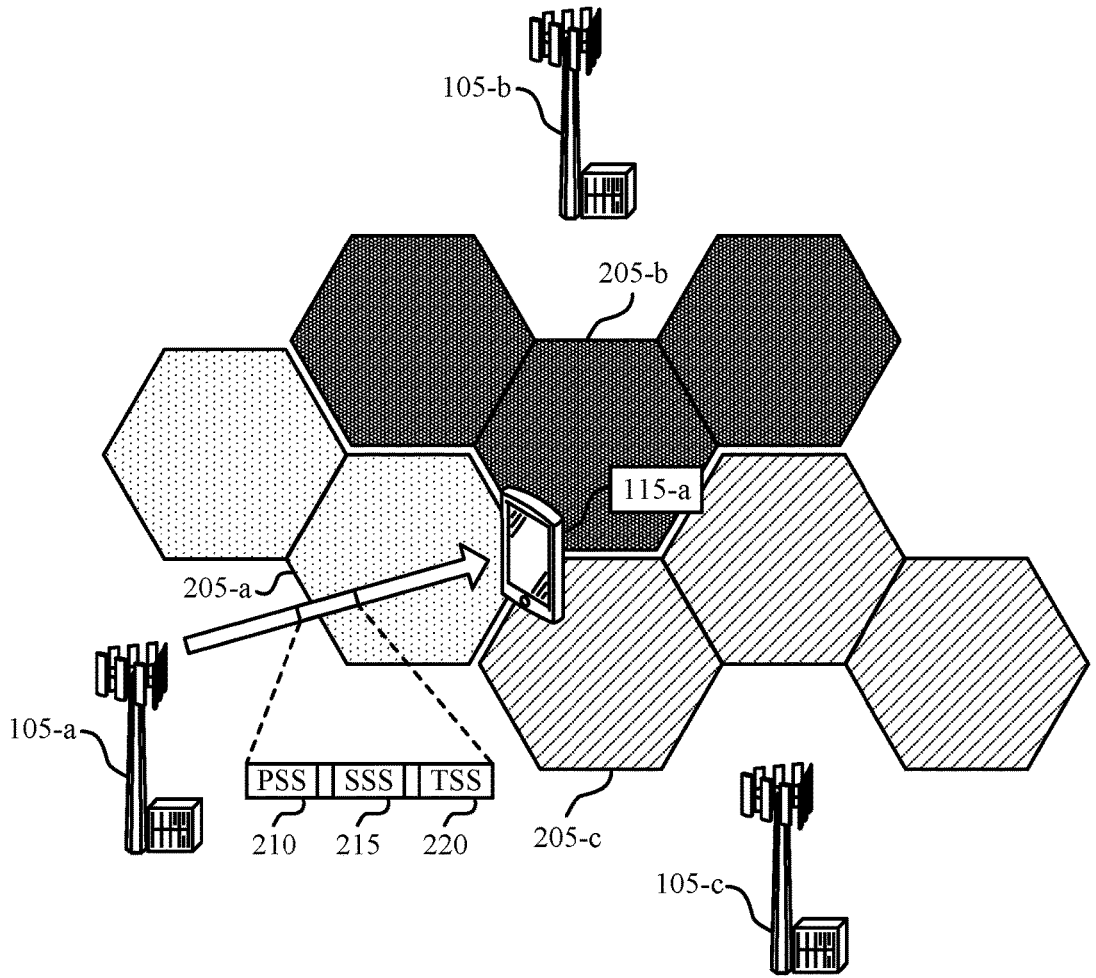

FIG. 2 shows an example of a wireless communications system 200 that supports hierarchical physical cell identifier addressing in accordance with one or more aspects of the present disclosure. The wireless communications system 200 may implement one or more aspects of the wireless communications system 100. For example, the wireless communications system 200 includes a UE 115-a, a network entity 105-a, a network entity 105-b, and a network entity 105-c, which may be examples of corresponding devices shown and described with reference to FIG. 1. As depicted in the example of FIG. 2, the UE 115-a may communicate with the network entity 105-a, the network entity 105-b, and the network entity 105-c via a cell 205-a, a cell 205-b, and a cell 205-c, respectively.

As described herein, a cell may be defined by a frequency (such as a carrier frequency of a network entity 105) and a coverage area (such as a geographic zone served by the network entity 105). In some examples, each cell of a network entity 105 may have a corresponding PCI value between 0 and 1008. The network entity 105 may advertise (e.g., signal, indicate) the PCI value of a particular cell via an SSB. In particular, the UE 115-a may jointly (e.g., collectively) determine the PCI value of the cell based on a first value encoded by a PSS of the SSB and a second value encoded by a SSS of the SSB. The PCI value of a cell may be used for various purposes, including (but not limited to) cell search, cell selection, scrambling/descrambling, measurement reporting, etc.

The PCI value provided by the network entity 105 may enable the UE 115-a to distinguish a particular cell from other cells in the same frequency or coverage area. In some cases, however, if two cells share the same PCI (referred to as a PCI conflict), the UE 115-a may experience setup failures, dropped calls, handover issues, channel interference, etc. PCI conflicts can include PCI confusion (where two neighbor cells have the same PCI value) or PCI collision (where a serving cell and a neighbor cell have the same PCI value). As an example, PCI confusion may occur if the UE 115-a is being served by the cell 205-a, and two neighboring cells (such as the cell 205-*b* and the cell 205-*c*) have the same PCI value. PCI collision may occur if the serving cell of the UE 115-*a* (such as the cell 205-*a*) and a neighboring cell (such as the cell 205-*b* or the cell 205-*c*) share the same PCI value. In some cases, network planning can help mitigate PCI conflicts. However, such approaches may be somewhat resource-intensive, and PCI conflicts that do occur may persist for a relatively long time.

In accordance with examples as described herein, the UE 115-*a* may determine a PCI of a cell based on hierarchical synchronization sequences. For example, possible code values for a PSS 210 and an SSS 215 received via a cell may be partitioned into subspaces, where some subspaces may fully encode the PCI of a cell, while other subspaces may partially encode the PCI. If the PSS 210 and the SSS 215 partially encode the PCI, the UE 115-*a* may detect one or more additional signals, such as a tertiary synchronization signal (TSS 220), a quaternary synchronization signal (QSS), or other signals. For example, the TSS 220 (e.g., or the QSS, or other signals) may be or include a sequence of one or more signals that indicate additional code for calculating the PCI of the cell. As such, the PCI may be jointly encoded by the first code, the second code, and the additional code.

To determine a PCI (e.g., or a cell identity) for the cell 205-*a*, the UE 115-*a* may detect (e.g., receive, monitor) a PSS 210 and an SSS 215 from the network entity 105-*a* (e.g., via the cell 205-*a*). In some examples, the PSS 210 may indicate a first code which may have one of three values (e.g., an integer value between zero and two), and the SSS 215 may indicate a second code value which may have one of 366 values (e.g., an integer value between zero and 365). As described herein, a subset of the possible combinations of the three values for the first code and the 365 values for the second code may partially encode the PCI of cell, and the PCI may be jointly encoded by the first code, the second code, and at least a third code. These quantities are exemplary, however, and in other examples different quantities for the first code value (e.g., a quantity other than three values), the second code value (e.g., a quantity other than 365 values), or both, may be used.

For example, the UE 115-*a* may determine that the indicated value for the first code and the indicated value for the second code partially encode the PCI (e.g., based on configured values for the first code, the second code, or both). Accordingly, based on the values for the first code and the second code, the UE 115-*a* may monitor for and receive (e.g., detect) a TSS 220 from the network entity 105-*a* (e.g., via the cell 205-*a*) which indicates the third code. In some examples, the network entity 105-*a* may (e.g., only) transmit the TSS 220 (e.g., via the cell 205-*a*) based on the values for the first code and the second code partially encoding the PCI of the cell 205-*a*. The UE 115-*a* may extract the third code from the TSS 220, and the UE 115-*a* may calculate the PCI for the cell 205-*a* based on the first code, the second code, and the third code.

In some other examples, if the indicated values for the first code and for the second code fully encode the PCI, the UE 115-*a* may refrain from monitoring for the TSS 220 (e.g., or other additional synchronization signals). Additionally, or alternatively, if the values for the first code and the second code fully encode the PCI, the network entity 105-*a* may refrain from transmitting the TSS 220 (e.g., via the cell 205-*a*).

In some examples, if the UE 115-*a* identifies a third code based on monitoring for a TSS 220, there may be additional hierarchies of synchronization sequences for decoding the PCI. For example, a subset of values of the third code, in combination with the values for the first code and the second code, may still partially encode the PCI. In these examples, the UE 115-*a* may monitor for additional signals (e.g., a QSS) to determine additional code (e.g., a fourth code) for calculation of the PCI.

In some cases, the PSS 210, the SSS 215, or both, may include assistance information to assist the UE 115-*a* in receiving the TSS 220. Additionally, or alternatively, the network entity 105-*a* may transmit (e.g., via the cell 205-*a*) a message including the assistance information. In some examples, the assistance information may include a time occasion, a frequency location, or both, in which the TSS 220 is to be transmitted (e.g., by the network entity 105-*a*). In some cases, as the UE 115-*a* may receive assistance information for the TSS 220, the TSS 220 to be transmitted outside of a frequency bandwidth associated with (e.g., indicated by) a synchronization raster (e.g., within a synchronization block) used in cell acquisition by the UE 115-*a*, thereby providing additional flexibility.

In some examples, the UE 115-*a* may monitor for the TSS 220 after successfully decoding a master information block, which may be based on successfully receiving the PSS 210 and the SSS 215 pair (e.g., without a collision between the PSS 210 and the SSS 215). For example, receiving the TSS 220 may be based on successfully decoding the master information block (e.g., which may include information for reception of the TSS 220). Additionally, or alternatively, the UE 115-*a* may perform one or more wireless communications with the cell 205-*a* based on successfully decoding the master information block.

In some examples, the TSS 220 may be transmitted in a frequency location (e.g., a frequency bandwidth) that is relative to a center frequency associated with transmission of the PSS 210, the SSS 215, or both. For example, the frequency location for the TSS 220 may be based on a frequency offset relative to the center frequency. In some examples, the frequency offset may be indicated in the assistance information. Additionally, or alternatively, the UE 115-*a* may be configured with the frequency offset (e.g., by the network entity 105-*a* or another network entity 105). In some examples, one or more demodulation reference signals transmitted by the network entity 105-*a* to the UE 115-*a* may be based (e.g., encoded based on) the PSS 210, the SSS 215, and the TSS 220 (e.g., and any other synchronization signals).

FIG. 3A shows an example of a diagram 300-*a* that supports hierarchical physical cell identifier addressing in accordance with one or more aspects of the present disclosure. As described herein, a UE 115 may determine a cell identity of a cell, such as a PCI, based on hierarchical synchronization sequences. For example, possible values for a first code value 305 associated with a first set of one or more signals (e.g., a PSS) and a second code value 310 associated with a second set of one or more signals (e.g., an SSS) may be partitioned. For example, a subset of first code values 305 and second code values 310 may fully encode a PCI of a cell. Another subset of first code values 305 and second code values 310 may partially encode the PCI, and a third code value 315 may be used to fully encode the PCI.

The diagram 300-*a* illustrates an example of this partition. In some examples, the first code value 305 may be one of three possible values (e.g., an integer between zero and two). Each of the three possible values for the first code value 305 may be associated with one of 366 possible values for the second code value 310 (e.g., an integer between zero and 365), thereby supporting 1008 possible combinations of the first code value 305 and the second code value 310. As illustrated in FIG. 3A a subset 320 of the 1008 possible combinations may be associated with a third code value 315. For example, for the subset 320 of the possible combinations of the first code value 305 and the second code value 310, the third code value 315 may also be used for encoding of the PCI of the cell. These quantities are exemplary, however, and in other examples different quantities for the first code value (e.g., a quantity other than three values), the second code value (e.g., a quantity other than 365 values), or both, may be used, which may lead to a different quantity of possible combinations (e.g., other than 1008 combinations).

In some examples and as shown in FIG. 3A, a subset 320 of second code values 310 corresponding to each of the first code values 305 may be associated with a third code value 315. As such, a subset 320-*a*, a subset 320-*b*, and a subset 320-*c* of the second code values 310 may be associated with a third code value 315. If each of the subset 320-*a*, the subset 320-*b*, and the subset 320-*c* have a quantity of values equal to n, and there are a quantity of n possible third code values 315, this may result in an increase of 3n²-3n for the possible PCI values, while a quantity of filter operations performed by a UE 115 may increase by (e.g., at most) n. As such, these techniques may achieve a quadratic (e.g., exponential) increase in PCI space for a linear increase in UE overhead. In some examples, however, each subset 320 may include different quantities of values, or the quantity of possible third code values 315 may be different from the quantities of values in a subset 320, or both.

FIG. 3B shows an example of a diagram 300-*b* that supports hierarchical physical cell identifier addressing in accordance with one or more aspects of the present disclosure. The diagram 300-*b* illustrates another example partition for the first code values 305 and the second code values 310. In this example, instead of selecting a subset 320 of second code values 310 for which a UE 115 is to monitor for a TSS, the diagram 300-*b* illustrates incrementing the possible second code values 310.

For example, a first quantity n of second code values 310-*a*, a second quantity n of second code values 310-*b*, and a third quantity n of second code values 310-*c* may be added to the possible second code values 310 in combination with first code value 305. Relative to the example in FIG. 3A where there may be 366 possible second code values 310 for each first code value 305, the example in FIG. 3B may result in a quantity of 366+n second code values 310 for each first code value 305. Each of the additional second code values 310 may be associated with a third code value 315, which may be selected from one of n values (e.g., an integer between 0 and n–1).

As such, this example may result in an increase of 3n² possible PCI values, while a quantity of filter operations performed by a UE 115 may increase by (e.g., at most) 2*n*. As such, these techniques may also achieve a quadratic (e.g., exponential) increase in PCI space for a linear increase in UE overhead. In some examples, however, the quantity of additional second code values 310 may be different from the quantity of possible third code values 315, resulting in different (e.g., also exponential) increases in PCI space.

Both the diagram 300-*a* and the diagram 300-*b* illustrate examples in which the quantity of first code values 305 remain the same. This may be beneficial as changing the quantity of first code values 305 may affect the sectorization of cell sites (e.g., areas) associated with network entity 105. In some examples, the example of diagram 300-*a* may result in a better tradeoff from a UE perspective, resulting in a larger PCI space increase relative to the increase in UE overhead. However, the example of diagram 300-*b* may result in having a same range of PCI values that are not associated with a third code value 315 relative to previous implementations (e.g., 5G implementations), thereby improving backwards compatibility.

Figure 4:
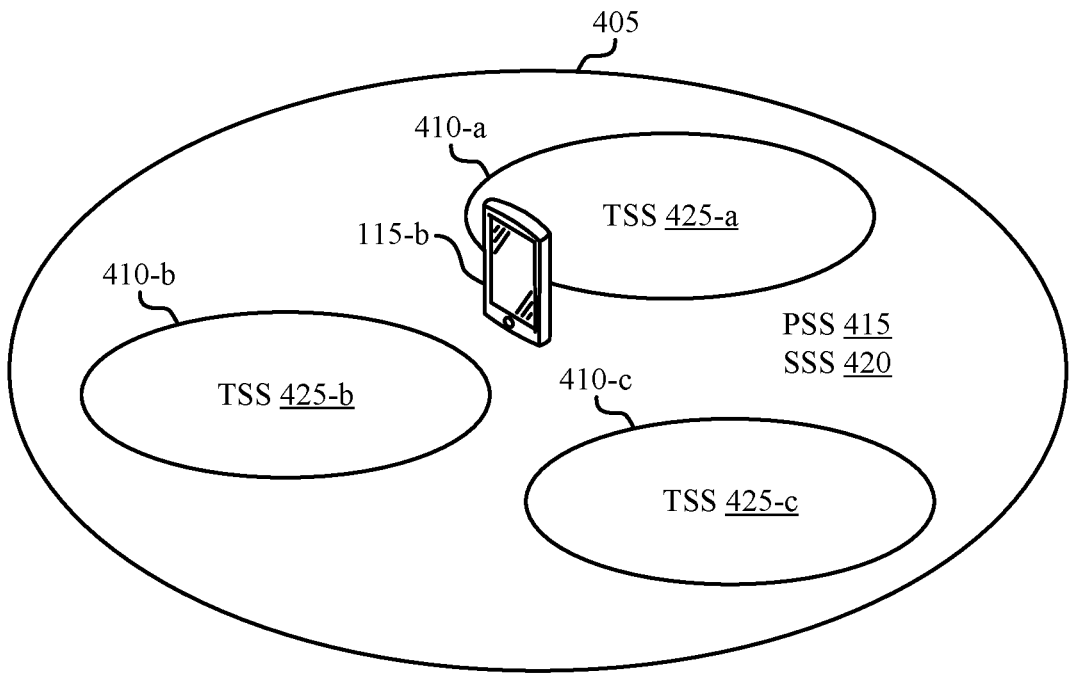
FIG. 4 shows an example of a wireless communications system that supports hierarchical physical cell identifier addressing in accordance with one or more aspects of the present disclosure.

FIG. 4 shows an example of a wireless communications system 400 that supports hierarchical physical cell identifier addressing in accordance with one or more aspects of the present disclosure. The wireless communications system 400 may implement one or more aspects of the wireless communications system 100 and the wireless communications system 200. For example, the wireless communications system 400 includes a UE 115-*b*, which may be an example of a UE 115 as described herein. As depicted in the example of FIG. 4, the UE 115-*b* may perform communications (e.g., with a network entity 105, not shown) via a macro cell 405 (e.g., an anchor cell), a cell 410-*c*, a cell 410-*b*, or a cell 410-*c*. The cells 410 may be example of small cells, which may correspond to the macro cell 405.

As described herein, a UE 115 may determine a cell identity of a cell, such as a PCI, based on synchronization sequences. For example, the UE 115-*b* may determine a PCI (e.g., a cell identity) of a cell based on a first code value indicated by a PSS 415 (e.g., a first set of one or more signals) and a second code value indicated by an SSS 420 (e.g., a second set of one or more signals). In some examples, the UE 115-*b* may additionally receive a TSS 425-*b* which may indicate a third code value to determine the PCI of a cell. In some cases, a PCI of the macro cell 405 may be fully encoded by the first code value and the second code value, while PCIs of the cell 410-*a*, the cell 410-*b*, and the cell 410-*c* may be partially encoded by the first code value and the second code value. In some examples, the cell 410-*a*, the cell 410-*b*, and the cell 410-*c* may be examples of small cells, mobile cells, subscriber-based cells, or a combination thereof.

As illustrated in the example of FIG. 4, each of the cell 410-*a*, the cell 410-*b*, and the cell 410-*c* may transmit a TSS 425-*a*, a TSS 425-*b*, and a TSS 425-*c*, respectively, for calculation of respective PCI values associated with each cell 410. For example, to determine a PCI value for the cell 410-*a*, the UE 115-*b* may monitor for the PSS 415 and the SSS 420 from the macro cell 405 to determine a first code value and a second code value. The UE 115-*b* may also monitor for the TSS 425-*a* from the cell 410-*a* to obtain (e.g., extract, determine) a third code value, and the UE 115-*b* may determine (e.g., calculate) the PCI of the cell 410-*a* based on the first code value and the second code value obtained via the macro cell 405 and based on the third code value obtained directly from the cell 410-*a*. This may increase PCI space (e.g., possible PCI values) without having any cell transmit more than two synchronization signals (e.g., the PSS 415 and the SSS 420).

In some examples, the macro cell 405 may transmit an indication of assistance information for reception of a TSS 425. For example, the macro cell 405 may transmit an indication of assistance information for reception of TSSs 425 (e.g., the TSS 425-*a*, the TSS 425-*b*, the TSS 425-*c*) for each cell 410 (e.g., the cell 410-*a*, the cell 410-*b*, the cell 410-*c*) within a coverage area of the macro cell 405. This may allow for a TSS 425 to be transmitted in a frequency bandwidth outside of a synchronization raster of the respective cell 410. Additionally, or alternatively, the UE 115-*a* may receive system information for the cell 410 from the macro cell 405.

In some examples, the macro cell 405 may signal or indicate a configuration for transmission of a TSS 425 to each cell 410 within the coverage area. For example, the cell 410-*a* may receive from the macro cell 405 signaling which may configure the cell 410-*a* to transmit the TSS 425-*a*. The signaling may include information for transmission of the TSS 425, such as frequency information, time information, an indication of the signal to be transmitted (e.g., the third code value), other information, or a combination thereof.

In some examples, for the UE 115-*b* to access (e.g., begin communications with) the cell 410-*a*, the UE 115-*b* may first perform initial access (e.g., camp) on the macro cell 405, and the cell 410-*a* may be added as a secondary cell for the UE 115-*b* after the initial access. Additionally, or alternatively, the UE 115-*b* may first select the macro cell 405, acquire assistance information for transmission of the TSS 425-*a*, and then perform initial access on the cell 410-*a* based on receiving the TSS 425-*a*. In other examples, the UE 115-*b* may access the cell 410-*a* directly, and perform initial access on the first cell 410-*a*. In these examples, the TSS 425-*a* may be transmitted on the synchronization raster of the cell 410-*a*, as the UE 115-*b* may not be able to receive assistance information from the macro cell 405 for reception of the TSS 425-*a*.

Figure 5:
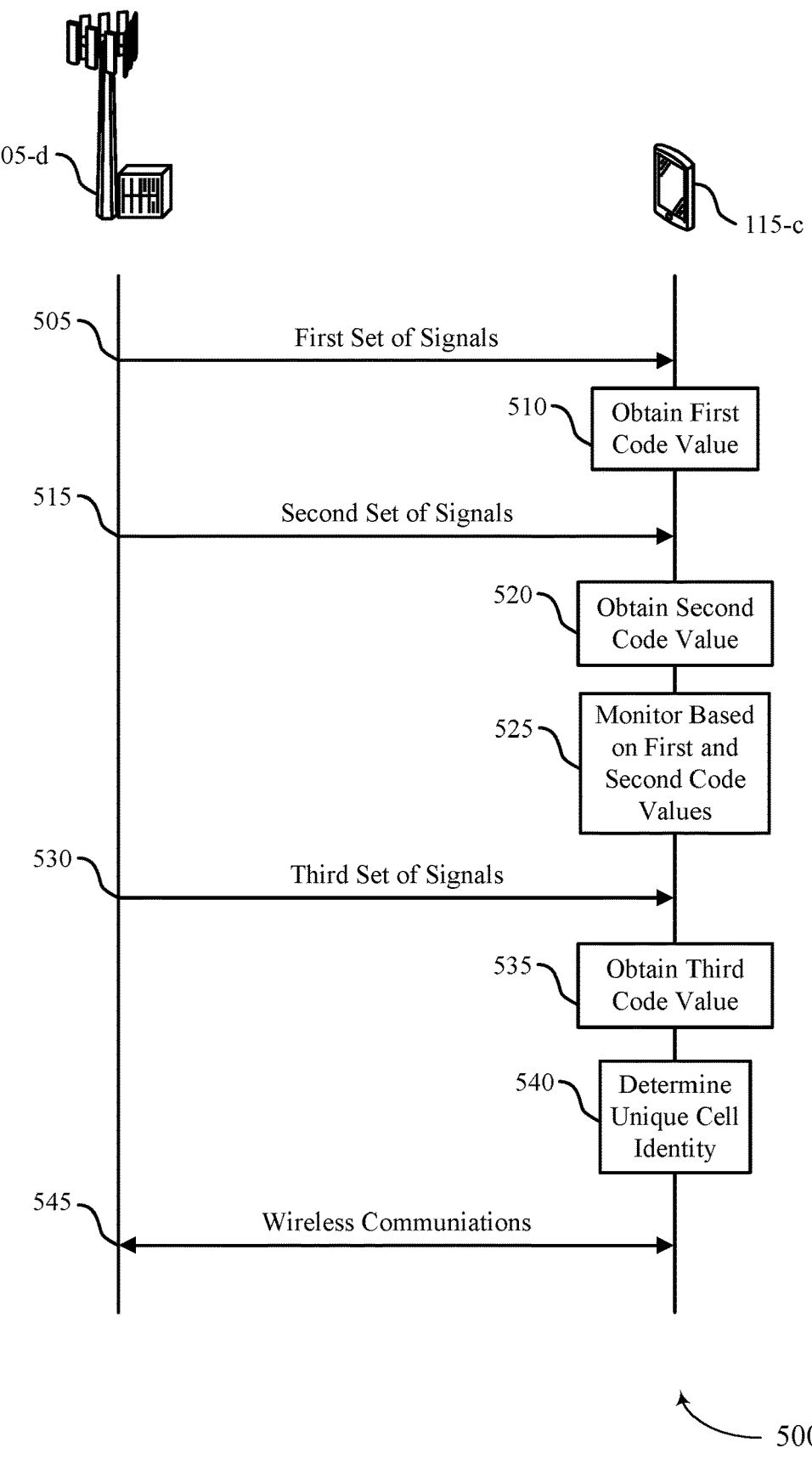
FIG. 5 shows an example of a process flow that supports hierarchical physical cell identifier addressing in accordance with one or more aspects of the present disclosure.

FIG. 5 shows an example of a process flow 500 that supports hierarchical physical cell identifier addressing in accordance with one or more aspects of the present disclosure. The process flow 500 illustrates communications between a network entity 105-*d* and a UE 115-*c*, which may be examples of corresponding devices as described herein, with reference to FIGS. 1 through 4. In some examples, the steps shown in the process flow 500 may be performed in different orders than shown, and some steps may be combined. Additionally, or alternatively, some steps may be added or omitted form the process flow 500. The process flow 500 may illustrate a procedure for the UE 115-*c* to initiate communications with a cell, which may be supported by the network entity 105-*d*.

At 505, the UE 115-*c* may receive a first set of one or more signals (e.g., a PSS) from the network entity 105-*d*. In some examples, the first set of one or more signals may be received from the network entity 105-*d* via the cell. Alternatively, the first set of one or more signals may be received via a macro cell associated with the cell.

At 510, the UE 115-*c* may obtain (e.g., extract) a first code value from the first set of one or more signals. In some examples, the first code value may have a range of three possible values (e.g., an integer value between zero and 2).

At 515, the UE 115-*c* may receive a second set of one or more signals (e.g., an SSS) from the network entity 105-*d*. In some examples, the first set of one or more signals may be received from the network entity 105-*d* via the cell. Alternatively, the first set of one or more signals may be received via a macro cell associated with the cell. In some examples, the step 515 may be combined with step 505. For example, the UE 115-*c* may receive (e.g., concurrently) the first set of one or more signals and the second set of one or more signals (e.g., as one set of signals), and the UE 115-*c* may extract the first code value and the second code value after receiving the signals.

At 520, the UE 115-*c* may obtain (e.g., extract) a second code value from the second set of one or more signals. In some examples, the second code value may have a range of 366 possible values (e.g., an integer value between zero and 366).

At 525, the UE 115-*c* may monitor for a third set of one or more signals (e.g., a TSS) based on the first code value and the second code value. For example, the UE 115-*c* may determine that the combination of the first code value and the second code value do not fully encode a cell identity (e.g., a PCI) of the cell. Additionally, or alternatively, the UE 115-*c* may determine to monitor for the third set of one or more signals from the cell based on obtaining the first code value and the second code value from a macro cell.

At 530, the UE 115-*c* may receive the third set of one or more signals (e.g., the TSS) from the network entity 105-*d* via the cell. In some examples, the UE 115-*c* may receive the third set of one or more signals based on assistance information included within the first set of one or more signals, the second set of one or more signals, or both. In some examples, step 530 may be combined with step 505, step 515, or both. For example, the UE 115-*c* may receive the third set of one or more signals alongside the first set of one or more signals, the second set of one or more signals, or both. Additionally, or alternatively, the first set of one or more signals, the second set of one or more signals, and the third set of one or more signals, or any combination thereof, may be the same. In these examples, step 525 may be omitted.

At 535, the UE 115-*c* may obtain (e.g., extract) a third code value from the third set of one or more signals. At 540, the UE 115-*c* may determine a unique cell identity (e.g., a unique PCI) for the cell based on the first code value, the second code value and the third value.

At 545, the UE 115-*c* may perform one or more wireless communications with the network entity 105-*d* via the cell based on determining the cell identity. Accordingly, the UE 115-*c* may communicate via the cell while avoiding conflicts or confusion caused by neighboring cells with a same cell identity value. Further, the example described herein may increase the quantity of possible cell identity values in a quadratic (e.g., exponential) manner, while increasing the potential quantity of additional operations performed by the UE 115-*c* in a linear manner.

Figure 6:
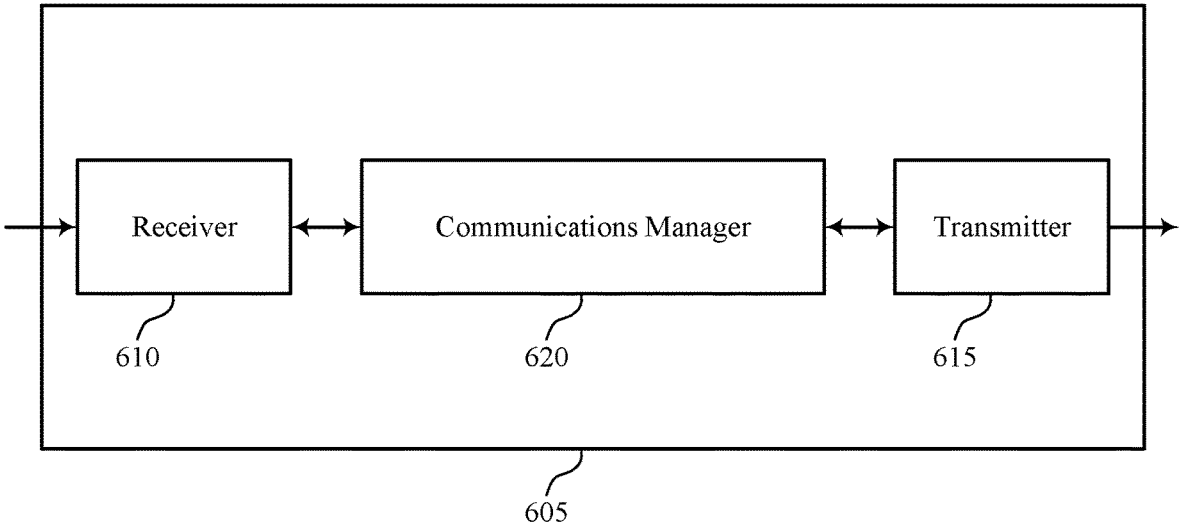
FIGS. 6 and 7 show block diagrams of devices that support hierarchical physical cell identifier addressing in accordance with one or more aspects of the present disclosure.

FIG. 6 shows a block diagram 600 of a device 605 that supports hierarchical physical cell identifier addressing in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to hierarchical physical cell identifier addressing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to hierarchical physical cell identifier addressing). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of hierarchical physical cell identifier addressing as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. For example, the communications manager 620 is capable of, configured to, or operable to support a means for receiving a first set of one or more signals and a second set of one or more signals, the first set of one or more signals indicating a first code value associated with a PCI, and the second set of one or more signals indicating a second code value associated with the PCI. The communications manager 620 is capable of, configured to, or operable to support a means for receiving, based on the first code value and the second code value, a third set of one or more signals indicating a third code value associated with the PCI. The communications manager 620 is capable of, configured to, or operable to support a means for communicating one or more wireless communications with a first cell according to a physical cell identity of the first cell, where the physical cell identity is jointly encoded by the first code value, the second code value, and the third code value.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for obtaining a cell identifier for a cell with reduced likelihood of PCI conflicts and more efficient utilization of communication resources.

Figure 7:
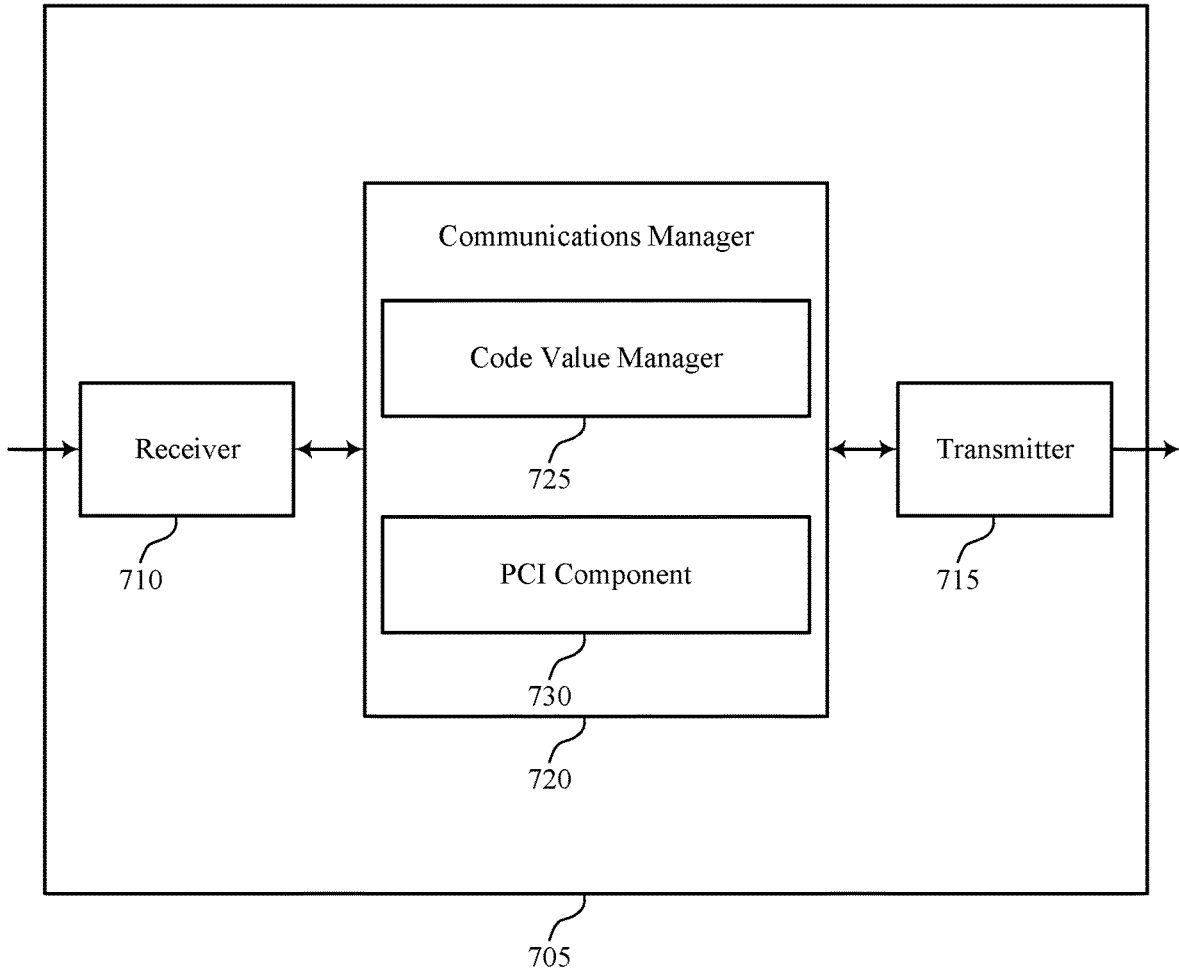

FIG. 7 shows a block diagram 700 of a device 705 that supports hierarchical physical cell identifier addressing in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to hierarchical physical cell identifier addressing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to hierarchical physical cell identifier addressing). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of hierarchical physical cell identifier addressing as described herein. For example, the communications manager 720 may include a code value manager 725 a PCI component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. The code value manager 725 is capable of, configured to, or operable to support a means for receiving a first set of one or more signals and a second set of one or more signals, the first set of one or more signals indicating a first code value associated with a PCI, and the second set of one or more signals indicating a second code value associated with the PCI. The code value manager 725 is capable of, configured to, or operable to support a means for receiving, based on the first code value and the second code value, a third set of one or more signals indicating a third code value associated with the PCI. The PCI component 730 is capable of, configured to, or operable to support a means for communicating one or more wireless communications with a first cell according to a physical cell identity of the first cell, where the physical cell identity is jointly encoded by the first code value, the second code value, and the third code value.

Figure 8:
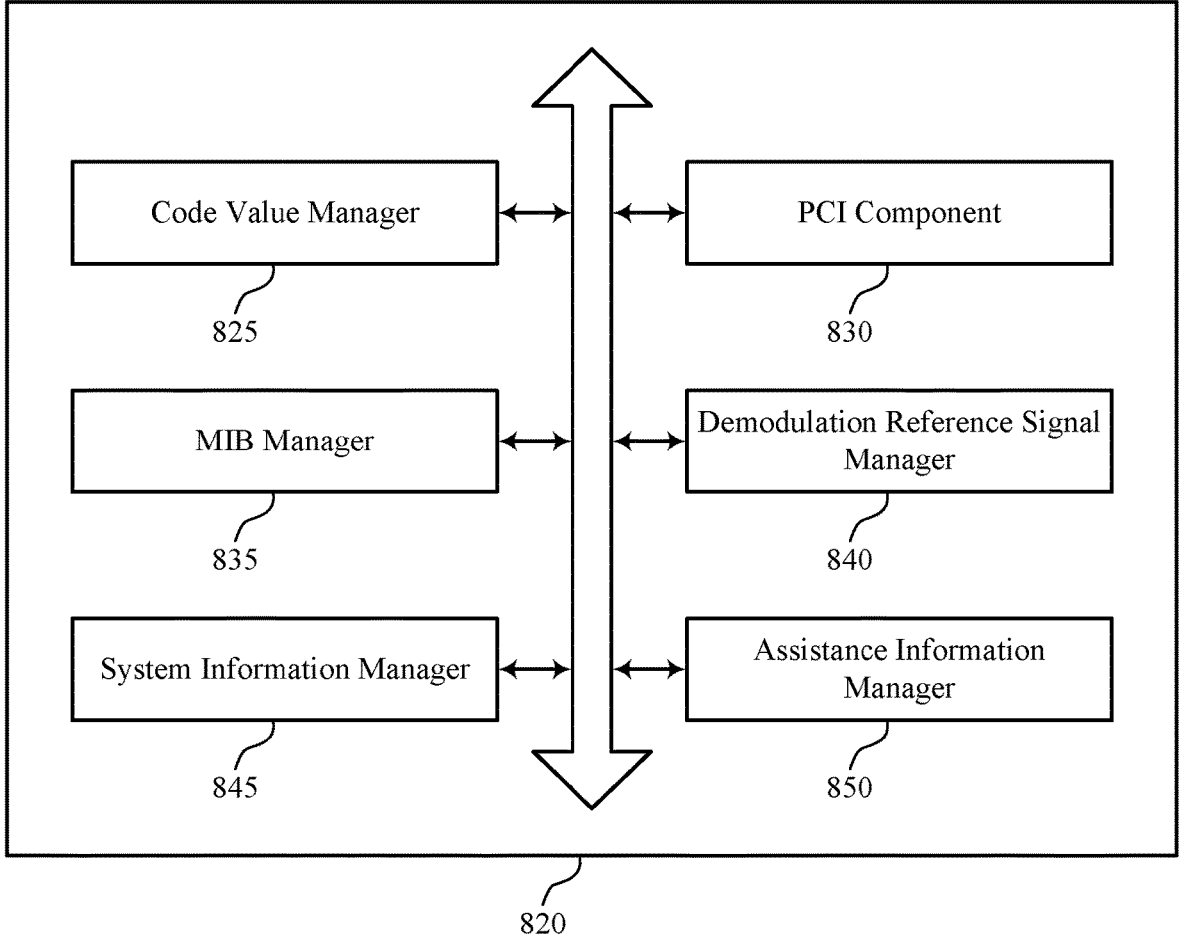
FIG. 8 shows a block diagram of a communications manager that supports hierarchical physical cell identifier addressing in accordance with one or more aspects of the present disclosure.

FIG. 8 shows a block diagram 800 of a communications manager 820 that supports hierarchical physical cell identifier addressing in accordance with one or more aspects of the present disclosure. The communications manager 820 may be an example of aspects of a communications manager 620, a communications manager 720, or both, as described herein. The communications manager 820, or various components thereof, may be an example of means for performing various aspects of hierarchical physical cell identifier addressing as described herein. For example, the communications manager 820 may include a code value manager 825, a PCI component 830, a MIB manager 835, a demodulation reference signal manager 840, a system information manager 845, an assistance information manager 850, or any combination thereof. Each of these components, or components or subcomponents thereof (e.g., one or more processors, one or more memories), may communicate, directly or indirectly, with one another (e.g., via one or more buses).

The communications manager 820 may support wireless communication in accordance with examples as disclosed herein. The code value manager 825 is capable of, configured to, or operable to support a means for receiving a first set of one or more signals and a second set of one or more signals, the first set of one or more signals indicating a first code value associated with a PCI, and the second set of one or more signals indicating a second code value associated with the PCI. In some examples, the code value manager 825 is capable of, configured to, or operable to support a means for receiving, based on the first code value and the second code value, a third set of one or more signals indicating a third code value associated with the PCI. The PCI component 830 is capable of, configured to, or operable to support a means for communicating one or more wireless communications with a first cell according to a physical cell identity of the first cell, where the physical cell identity is jointly encoded by the first code value, the second code value, and the third code value.

In some examples, to support receiving the third set of one or more signals, the code value manager 825 is capable of, configured to, or operable to support a means for monitoring for the third set of one or more signals based on the first code value being within a first subset of values of a set of first code values and on the second code value being within a second subset of values of a set of second code values.

In some examples, the first set of one or more signals and the second set of one or more signals are received from a second cell different from the first cell. In some examples, the third set of one or more signals is received from the first cell.

In some examples, the assistance information manager 850 is capable of, configured to, or operable to support a means for receiving, from the second cell, a message including assistance information for reception of the third set of one or more signals from the first cell, where receiving the third set of one or more signals from the first cell is based on the assistance information.

In some examples, the first set of one or more signals and the second set of one or more signals are received via a first frequency within a frequency bandwidth indicated by a synchronization raster and the third set of one or more signals is received via a second frequency within the frequency bandwidth indicated by the synchronization raster.

In some examples, the system information manager 845 is capable of, configured to, or operable to support a means for receiving, from the second cell, system information associated with the first cell.

In some examples, the code value manager 825 is capable of, configured to, or operable to support a means for receiving a fourth set of one or more signals indicating a fourth code value associated with the PCI based on the first code value, the second code value, and the third code value, where communicating the one or more wireless communications with the first cell according to the physical cell identity of the first cell is further based on the fourth code value.

In some examples, the fourth set of one or more signals is received based on the third code value being within a third subset of values of a set of third code values.

In some examples, the first set of one or more signals, the second set of one or more signals, or both, indicate assistance information for reception of the third set of one or more signals.

In some examples, the assistance information indicates a frequency location for reception of the third set of one or more signals based on a frequency offset from a center frequency associated with reception of the first set of one or more signals and the second set of one or more signals.

In some examples, the first set of one or more signals and the second set of one or more signals are received via a first frequency within a frequency bandwidth indicated by a synchronization raster, and the third set of one or more signals is received via a second frequency outside of the frequency bandwidth indicated by the synchronization raster based on the assistance information.

In some examples, the MIB manager 835 is capable of, configured to, or operable to support a means for decoding a master information block associated with communications with the first cell based on receiving the first code value, the second code value, and the third code value, where communicating one or more wireless communications with a first cell is based on successfully decoding the master information block.

In some examples, the MIB manager 835 is capable of, configured to, or operable to support a means for decoding a master information block associated with communications with the first cell based on receiving the first code value and the second code value, where receiving the third set of one or more signals is based on successfully decoding the master information block.

In some examples, the demodulation reference signal manager 840 is capable of, configured to, or operable to support a means for receiving, form the first cell, a demodulation reference signal based on the first code value, the second code value, and the third code value.

Figure 9:
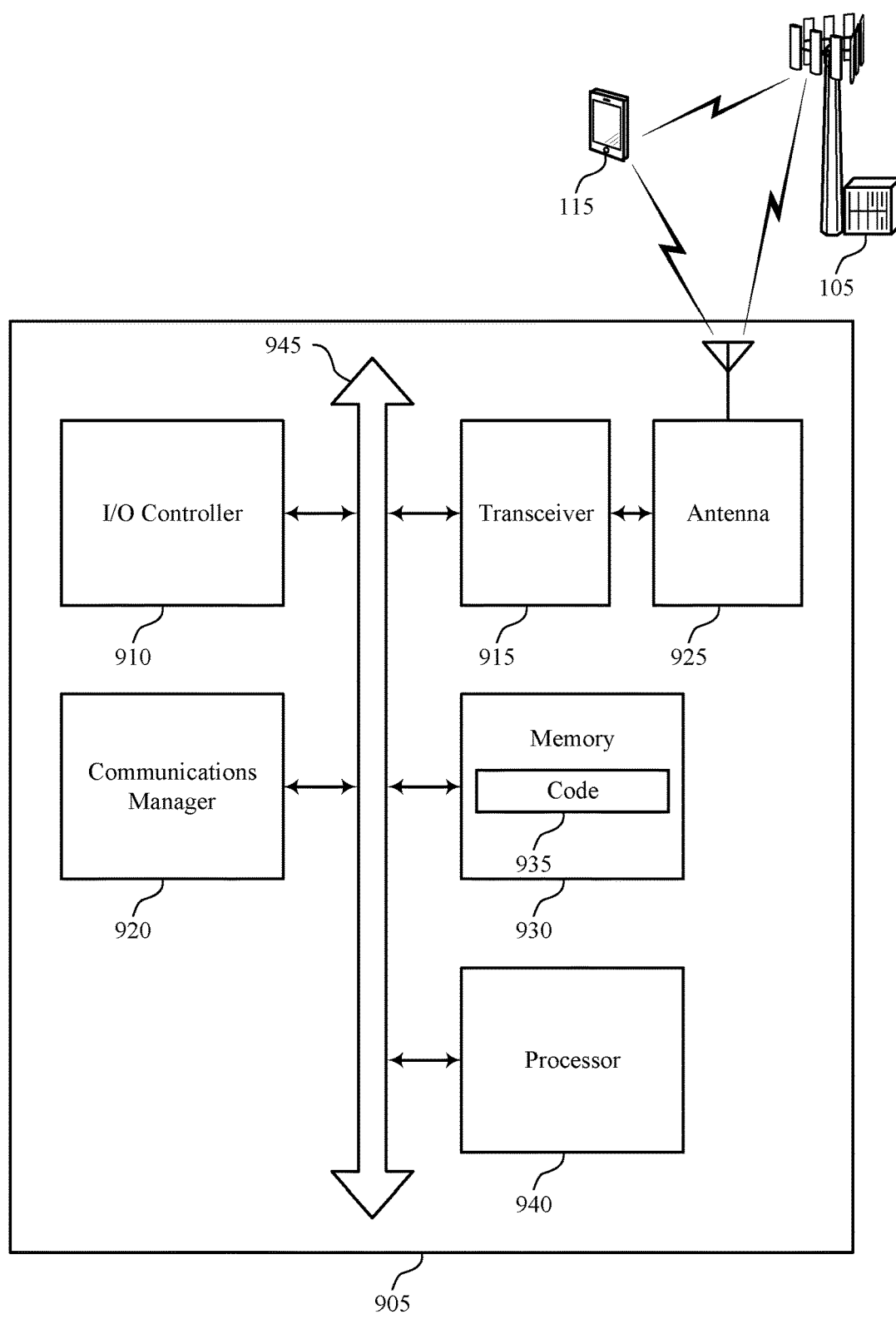
FIG. 9 shows a diagram of a system including a device that supports hierarchical physical cell identifier addressing in accordance with one or more aspects of the present disclosure.

FIG. 9 shows a diagram of a system 900 including a device 905 that supports hierarchical physical cell identifier addressing in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable (e.g., processor-executable) code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting hierarchical physical cell identifier addressing). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communication in accordance with examples as disclosed herein. For example, the communications manager 920 is capable of, configured to, or operable to support a means for receiving a first set of one or more signals and a second set of one or more signals, the first set of one or more signals indicating a first code value associated with a PCI, and the second set of one or more signals indicating a second code value associated with the PCI. The communications manager 920 is capable of, configured to, or operable to support a means for receiving, based on the first code value and the second code value, a third set of one or more signals indicating a third code value associated with the PCI. The communications manager 920 is capable of, configured to, or operable to support a means for communicating one or more wireless communications with a first cell according to a physical cell identity of the first cell, where the physical cell identity is jointly encoded by the first code value, the second code value, and the third code value.

By including or configuring the communications manager 920 in accordance with examples as described herein, the device 905 may support techniques for obtaining a cell identifier that reduces the likelihood of PCI conflicts and PCI confusion, while supporting more efficient utilization of communication and device resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of hierarchical physical cell identifier addressing as described herein, or the at least one processor 940 and the at least one memory 930 may be otherwise configured to, individually or collectively, perform or support such operations.

Figure 10:
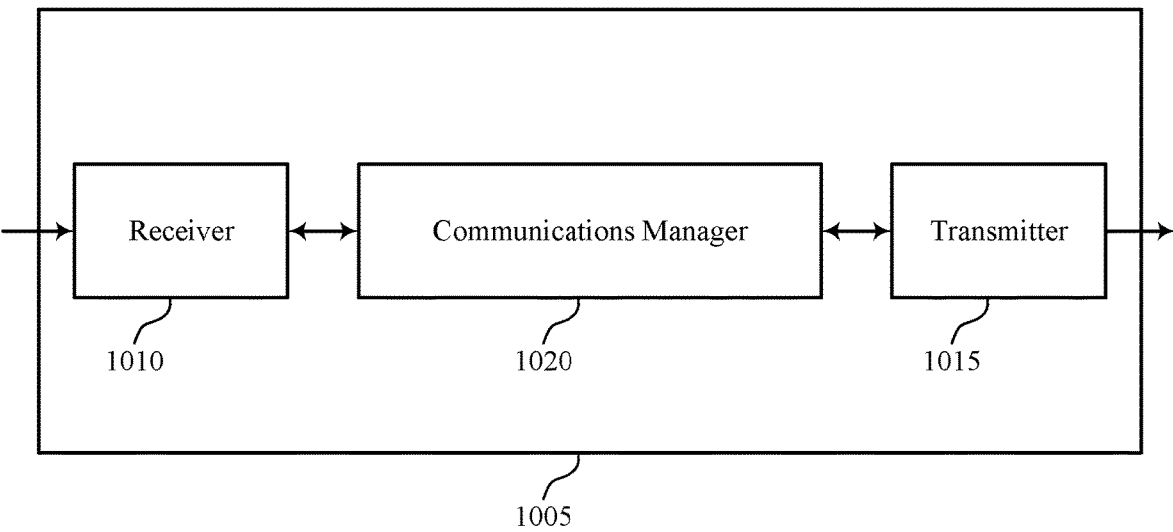
FIGS. 10 and 11 show block diagrams of devices that support hierarchical physical cell identifier addressing in accordance with one or more aspects of the present disclosure.

FIG. 10 shows a block diagram 1000 of a device 1005 that supports hierarchical physical cell identifier addressing in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of hierarchical physical cell identifier addressing as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. For example, the communications manager 1020 is capable of, configured to, or operable to support a means for transmitting a first set of one or more signals and a second set of one or more signals, the first set of one or more signals indicating a first code value associated with a PCI, and the second set of one or more signals indicating a second code value associated with the PCI. The communications manager 1020 is capable of, configured to, or operable to support a means for transmitting, based on the first code value and the second code value, a third set of one or more signals indicating a third code value associated with the PCI. The communications manager 1020 is capable of, configured to, or operable to support a means for communicating, via a first cell, one or more wireless communications with a UE according to a physical cell identity of the first cell, where the physical cell identity is jointly encoded by the first code value, the second code value, and the third code value.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for obtaining a cell identifier that reduces the likelihood of PCI conflicts and PCI confusion, while supporting more efficient utilization of communication and device resources.

Figure 11:
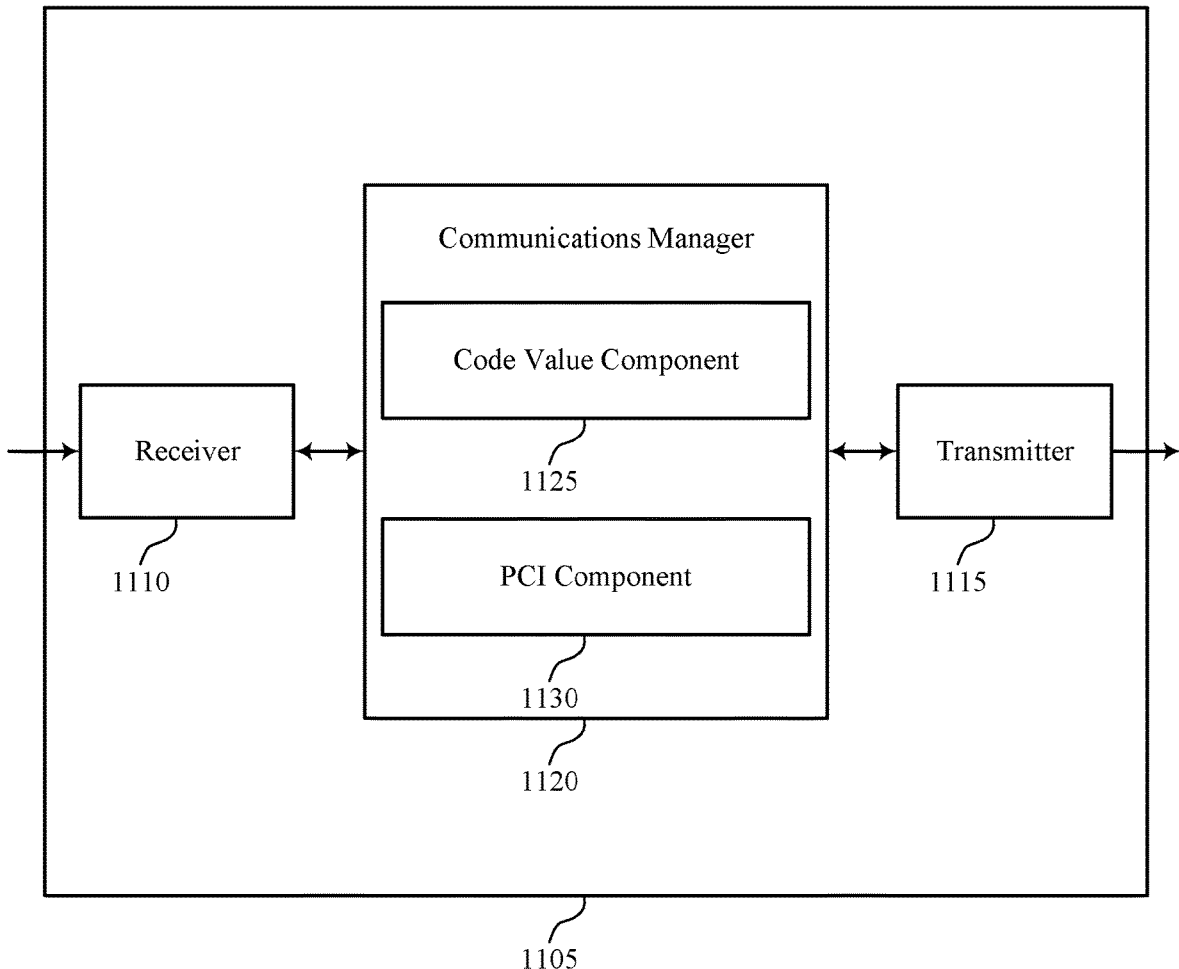

FIG. 11 shows a block diagram 1100 of a device 1105 that supports hierarchical physical cell identifier addressing in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of hierarchical physical cell identifier addressing as described herein. For example, the communications manager 1120 may include a code value component 1125 a PCI component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. The code value component 1125 is capable of, configured to, or operable to support a means for transmitting a first set of one or more signals and a second set of one or more signals, the first set of one or more signals indicating a first code value associated with a PCI, and the second set of one or more signals indicating a second code value associated with the PCI. The code value component 1125 is capable of, configured to, or operable to support a means for transmitting, based on the first code value and the second code value, a third set of one or more signals indicating a third code value associated with the PCI. The PCI component 1130 is capable of, configured to, or operable to support a means for communicating, via a first cell, one or more wireless communications with a UE according to a physical cell identity of the first cell, where the physical cell identity is jointly encoded by the first code value, the second code value, and the third code value.

Figure 12:
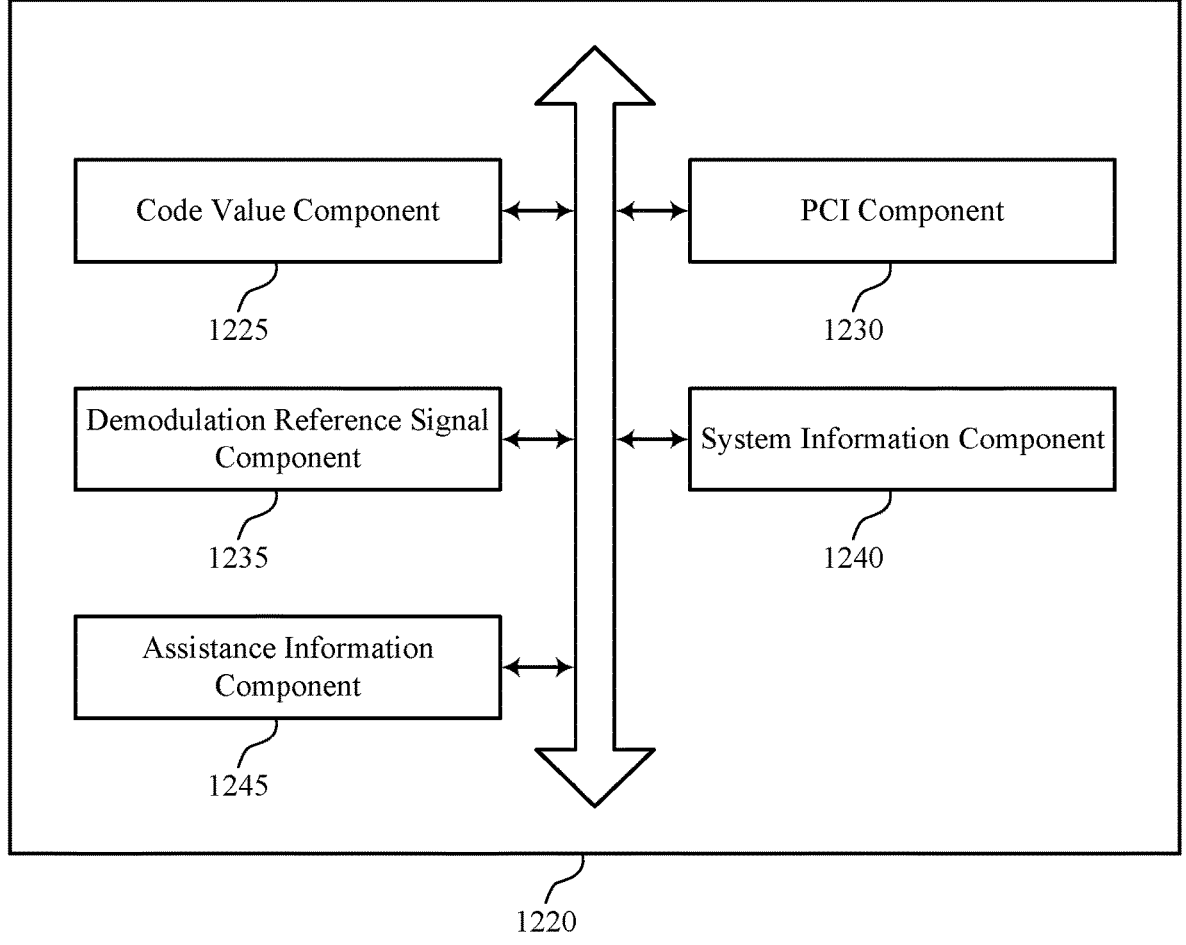
FIG. 12 shows a block diagram of a communications manager that supports hierarchical physical cell identifier addressing in accordance with one or more aspects of the present disclosure.

FIG. 12 shows a block diagram 1200 of a communications manager 1220 that supports hierarchical physical cell identifier addressing in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of hierarchical physical cell identifier addressing as described herein. For example, the communications manager 1220 may include a code value component 1225, a PCI component 1230, a demodulation reference signal component 1235, a system information component 1240, an assistance information component 1245, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication in accordance with examples as disclosed herein. The code value component 1225 is capable of, configured to, or operable to support a means for transmitting a first set of one or more signals and a second set of one or more signals, the first set of one or more signals indicating a first code value associated with a PCI, and the second set of one or more signals indicating a second code value associated with the PCI. In some examples, the code value component 1225 is capable of, configured to, or operable to support a means for transmitting, based on the first code value and the second code value, a third set of one or more signals indicating a third code value associated with the PCI. The PCI component 1230 is capable of, configured to, or operable to support a means for communicating, via a first cell, one or more wireless communications with a UE according to a physical cell identity of the first cell, where the physical cell identity is jointly encoded by the first code value, the second code value, and the third code value.

In some examples, the code value component 1225 is capable of, configured to, or operable to support a means for transmitting the third set of one or more signals based on the first code value being within a first subset of values of a set of first code values and on the second code value being within a second subset of values of a set of second code values.

In some examples, the first set of one or more signals and the second set of one or more signals are transmitted via a second cell different from the first cell. In some examples, the third set of one or more signals are transmitted via the first cell.

In some examples, the assistance information component 1245 is capable of, configured to, or operable to support a means for transmitting, via the second cell, a message including assistance information for reception of the third set of one or more signals from the first cell, where transmitting the third set of one or more signals from the first cell is in accordance with the assistance information.

In some examples, the first set of one or more signals and the second set of one or more signals are transmitted via a first frequency within a frequency bandwidth indicated by a synchronization raster and the third set of one or more signals is transmitted via a second frequency within the frequency bandwidth indicated by the synchronization raster.

In some examples, the system information component 1240 is capable of, configured to, or operable to support a means for transmitting, via the second cell, system information associated with the first cell.

In some examples, the code value component 1225 is capable of, configured to, or operable to support a means for transmitting a fourth set of one or more signals indicating a fourth code value associated with the PCI based on the first code value, the second code value, and the third code value, where communicating the one or more wireless communications with the first cell according to the physical cell identity of the first cell is further based on the fourth code value.

In some examples, the fourth set of one or more signals further is transmitted based on the third code value being within a third subset of values of a set of third code values. In some examples, the first set of one or more signals, the second set of one or more signals, or both, indicate assistance information for reception of the third set of one or more signals.

In some examples, the assistance information indicates a frequency location for reception of the third set of one or more signals based on a frequency offset from a center frequency associated with reception of the first set of one or more signals and the second set of one or more signals.

In some examples, the first set of one or more signals and the second set of one or more signals are transmitted via a first frequency within a frequency bandwidth indicated by a synchronization raster, and the third set of one or more signals is transmitted via a second frequency outside of the frequency bandwidth indicated by the synchronization raster.

In some examples, the demodulation reference signal component 1235 is capable of, configured to, or operable to support a means for transmitting, via the first cell, a demodulation reference signal based on the first code value, the second code value, and the third code value.

Figure 13:
FIG. 13 shows a diagram of a system including a device that supports hierarchical physical cell identifier addressing in accordance with one or more aspects of the present disclosure.

FIG. 13 shows a diagram of a system 1300 including a device 1305 that supports hierarchical physical cell identifier addressing in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable (e.g., processor-executable) code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting hierarchical physical cell identifier addressing). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication in accordance with examples as disclosed herein. For example, the communications manager 1320 is capable of, configured to, or operable to support a means for transmitting a first set of one or more signals and a second set of one or more signals, the first set of one or more signals indicating a first code value associated with a PCI, and the second set of one or more signals indicating a second code value associated with the PCI. The communications manager 1320 is capable of, configured to, or operable to support a means for transmitting, based on the first code value and the second code value, a third set of one or more signals indicating a third code value associated with the PCI. The communications manager 1320 is capable of, configured to, or operable to support a means for communicating, via a first cell, one or more wireless communications with a UE according to a physical cell identity of the first cell, where the physical cell identity is jointly encoded by the first code value, the second code value, and the third code value.

By including or configuring the communications manager 1320 in accordance with examples as described herein, the device 1305 may support techniques for obtaining a cell identifier that reduces the likelihood of PCI conflicts and PCI confusion, while supporting more efficient utilization of communication and device resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of hierarchical physical cell identifier addressing as described herein, or the at least one processor 1335 and the at least one memory 1325 may be otherwise configured to, individually or collectively, perform or support such operations.

FIG. 14 shows a flowchart illustrating a method 1400 that supports hierarchical physical cell identifier addressing in accordance with examples as disclosed herein. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first set of one or more signals and a second set of one or more signals, the first set of one or more signals indicating a first code value associated with a PCI, and the second set of one or more signals indicating a second code value associated with the PCI. The operations of block 1405 may be performed in accordance with examples as disclosed herein. In some examples, aspects of the operations of 1405 may be performed by a code value manager 825 as described with reference to FIG. 8.

At 1410, the method may include receiving, based on the first code value and the second code value, a third set of one or more signals indicating a third code value associated with the PCI. The operations of block 1410 may be performed in accordance with examples as disclosed herein. In some examples, aspects of the operations of 1410 may be performed by a code value manager 825 as described with reference to FIG. 8.

At 1415, the method may include communicating one or more wireless communications with a first cell according to a physical cell identity of the first cell, where the physical cell identity is jointly encoded by the first code value, the second code value, and the third code value. The operations of block 1415 may be performed in accordance with examples as disclosed herein. In some examples, aspects of the operations of 1415 may be performed by a PCI component 830 as described with reference to FIG. 8.

FIG. 15 shows a flowchart illustrating a method 1500 that supports hierarchical physical cell identifier addressing in accordance with examples as disclosed herein. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first set of one or more signals and a second set of one or more signals, the first set of one or more signals indicating a first code value associated with a PCI, and the second set of one or more signals indicating a second code value associated with the PCI. The operations of block 1505 may be performed in accordance with examples as disclosed herein. In some examples, aspects of the operations of 1505 may be performed by a code value manager 825 as described with reference to FIG. 8.

At 1510, the method may include monitoring for the third set of one or more signals based on the first code value being within a first subset of values of a set of first code values and on the second code value being within a second subset of values of a set of second code values. The operations of block 1510 may be performed in accordance with examples as disclosed herein. In some examples, aspects of the operations of 1510 may be performed by a code value manager 825 as described with reference to FIG. 8.

At 1515, the method may include receiving, based on monitoring for the third set of one or more signals, the third set of one or more signals indicating a third code value associated with the PCI. The operations of block 1515 may be performed in accordance with examples as disclosed herein. In some examples, aspects of the operations of 1515 may be performed by a code value manager 825 as described with reference to FIG. 8.

At 1520, the method may include communicating one or more wireless communications with a first cell according to a physical cell identity of the first cell, where the physical cell identity is jointly encoded by the first code value, the second code value, and the third code value. The operations of block 1520 may be performed in accordance with examples as disclosed herein. In some examples, aspects of the operations of 1520 may be performed by a PCI component 830 as described with reference to FIG. 8.

FIG. 16 shows a flowchart illustrating a method 1600 that supports hierarchical physical cell identifier addressing in accordance with examples as disclosed herein. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a first set of one or more signals and a second set of one or more signals, the first set of one or more signals indicating a first code value associated with a PCI, and the second set of one or more signals indicating a second code value associated with the PCI. The operations of block 1605 may be performed in accordance with examples as disclosed herein. In some examples, aspects of the operations of 1605 may be performed by a code value component 1225 as described with reference to FIG. 12.

At 1610, the method may include transmitting, based on the first code value and the second code value, a third set of one or more signals indicating a third code value associated with the PCI. The operations of block 1610 may be performed in accordance with examples as disclosed herein. In some examples, aspects of the operations of 1610 may be performed by a code value component 1225 as described with reference to FIG. 12.

At 1615, the method may include communicating, via a first cell, one or more wireless communications with a UE according to a physical cell identity of the first cell, where the physical cell identity is jointly encoded by the first code value, the second code value, and the third code value. The operations of block 1615 may be performed in accordance with examples as disclosed herein. In some examples, aspects of the operations of 1615 may be performed by a PCI component 1230 as described with reference to FIG. 12.

FIG. 17 shows a flowchart illustrating a method 1700 that supports hierarchical physical cell identifier addressing in accordance with examples as disclosed herein. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first set of one or more signals and a second set of one or more signals, the first set of one or more signals indicating a first code value associated with a PCI, and the second set of one or more signals indicating a second code value associated with the PCI. The operations of block 1705 may be performed in accordance with examples as disclosed herein. In some examples, aspects of the operations of 1705 may be performed by a code value component 1225 as described with reference to FIG. 12.

At 1710, the method may include transmitting a third set of one or more signals based on the first code value being within a first subset of values of a set of first code values and on the second code value being within a second subset of values of a set of second code values. The operations of block 1710 may be performed in accordance with examples as disclosed herein. In some examples, aspects of the operations of 1710 may be performed by a code value component 1225 as described with reference to FIG. 12.

At 1715, the method may include communicating, via a first cell, one or more wireless communications with a UE according to a physical cell identity of the first cell, where the physical cell identity is jointly encoded by the first code value, the second code value, and the third code value. The operations of block 1715 may be performed in accordance with examples as disclosed herein. In some examples, aspects of the operations of 1715 may be performed by a PCI component 1230 as described with reference to FIG. 12.

The following provides an overview of aspects of the present disclosure:

Aspect 1: A method for wireless communication by a UE, comprising: receiving a first set of one or more signals and a second set of one or more signals, the first set of one or more signals indicating a first code value associated with a PCI, and the second set of one or more signals indicating a second code value associated with the PCI; receiving, based at least in part on the first code value and the second code value, a third set of one or more signals indicating a third code value associated with the PCI; and communicating one or more wireless communications with a first cell according to a physical cell identity of the first cell, wherein the physical cell identity is jointly encoded by the first code value, the second code value, and the third code value.

Aspect 2: The method of aspect 1, wherein receiving the third set of one or more signals further comprises: monitoring for the third set of one or more signals based at least in part on the first code value being within a first subset of values of a set of first code values and on the second code value being within a second subset of values of a set of second code values.

Aspect 3: The method of any of aspects 1 through 2, wherein the first set of one or more signals and the second set of one or more signals are received from a second cell different from the first cell.

Aspect 4: The method of aspect 3, wherein the third set of one or more signals is received from the first cell.

Aspect 5: The method of aspect 4, further comprising: receiving, from the second cell, a message including assistance information for reception of the third set of one or more signals from the first cell, wherein receiving the third set of one or more signals from the first cell is based at least in part on the assistance information.

Aspect 6: The method of any of aspects 4 through 5, wherein the first set of one or more signals and the second set of one or more signals are received via a first frequency within a frequency bandwidth indicated by a synchronization raster and the third set of one or more signals is received via a second frequency within the frequency bandwidth indicated by the synchronization raster.

Aspect 7: The method of any of aspects 3 through 6, further comprising: receiving, from the second cell, system information associated with the first cell.

Aspect 8: The method of any of aspects 1 through 7, further comprising: receiving a fourth set of one or more signals indicating a fourth code value associated with the PCI based at least in part on the first code value, the second code value, and the third code value, wherein communicating the one or more wireless communications with the first cell according to the physical cell identity of the first cell is further based at least in part on the fourth code value.

Aspect 9: The method of aspect 8, wherein the fourth set of one or more signals is received based at least in part on the third code value being within a third subset of values of a set of third code values.

Aspect 10: The method of any of aspects 1 through 9, wherein the first set of one or more signals, the second set of one or more signals, or both, indicate assistance information for reception of the third set of one or more signals.

Aspect 11: The method of aspect 10, wherein the assistance information indicates a frequency location for reception of the third set of one or more signals based at least in part on a frequency offset from a center frequency associated with reception of the first set of one or more signals and the second set of one or more signals.

Aspect 12: The method of any of aspects 10 through 11, wherein the first set of one or more signals and the second set of one or more signals are received via a first frequency within a frequency bandwidth indicated by a synchronization raster, and the third set of one or more signals is received via a second frequency outside of the frequency bandwidth indicated by the synchronization raster based at least in part on the assistance information.

Aspect 13: The method of any of aspects 1 through 12, further comprising: decoding a master information block associated with communications with the first cell based at least in part on receiving the first code value, the second code value, and the third code value, wherein communicating one or more wireless communications with a first cell is based at least in part on successfully decoding the master information block.

Aspect 14: The method of any of aspects 1 through 13, further comprising: decoding a master information block associated with communications with the first cell based at least in part on receiving the first code value and the second code value, wherein receiving the third set of one or more signals is based at least in part on successfully decoding the master information block.

Aspect 15: The method of any of aspects 1 through 14, further comprising: receiving, form the first cell, a demodulation reference signal based at least in part on the first code value, the second code value, and the third code value.

Aspect 16: A method for wireless communication by a network entity, comprising: transmitting a first set of one or more signals and a second set of one or more signals, the first set of one or more signals indicating a first code value associated with a PCI, and the second set of one or more signals indicating a second code value associated with the PCI; transmitting, based at least in part on the first code value and the second code value, a third set of one or more signals indicating a third code value associated with the PCI; and communicating, via a first cell, one or more wireless communications with a UE according to a physical cell identity of the first cell, wherein the physical cell identity is jointly encoded by the first code value, the second code value, and the third code value.

Aspect 17: The method of aspect 16, further comprising: transmitting the third set of one or more signals based at least in part on the first code value being within a first subset of values of a set of first code values and on the second code value being within a second subset of values of a set of second code values.

Aspect 18: The method of any of aspects 16 through 17, wherein the first set of one or more signals and the second set of one or more signals are transmitted via a second cell different from the first cell.

Aspect 19: The method of aspect 18, wherein the third set of one or more signals are transmitted via the first cell.

Aspect 20: The method of aspect 19, further comprising: transmitting, via the second cell, a message including assistance information for reception of the third set of one or more signals from the first cell, wherein transmitting the third set of one or more signals from the first cell is in accordance with the assistance information.

Aspect 21: The method of any of aspects 19 through 20, wherein the first set of one or more signals and the second set of one or more signals are transmitted via a first frequency within a frequency bandwidth indicated by a synchronization raster and the third set of one or more signals is transmitted via a second frequency within the frequency bandwidth indicated by the synchronization raster.

Aspect 22: The method of any of aspects 18 through 21, further comprising: transmitting, via the second cell, system information associated with the first cell.

Aspect 23: The method of any of aspects 16 through 22, further comprising: transmitting a fourth set of one or more signals indicating a fourth code value associated with the PCI based at least in part on the first code value, the second code value, and the third code value, wherein communicating the one or more wireless communications with the first cell according to the physical cell identity of the first cell is further based at least in part on the fourth code value.

Aspect 24: The method of aspect 23, wherein the fourth set of one or more signals further is transmitted based at least in part on the third code value being within a third subset of values of a set of third code values.

Aspect 25: The method of any of aspects 16 through 24, wherein the first set of one or more signals, the second set of one or more signals, or both, indicate assistance information for reception of the third set of one or more signals.

Aspect 26: The method of aspect 25, wherein the assistance information indicates a frequency location for reception of the third set of one or more signals based at least in part on a frequency offset from a center frequency associated with reception of the first set of one or more signals and the second set of one or more signals.

Aspect 27: The method of any of aspects 25 through 26, wherein the first set of one or more signals and the second set of one or more signals are transmitted via a first frequency within a frequency bandwidth indicated by a synchronization raster, and the third set of one or more signals is transmitted via a second frequency outside of the frequency bandwidth indicated by the synchronization raster.

Aspect 28: The method of any of aspects 16 through 27, further comprising: transmitting, via the first cell, a demodulation reference signal based at least in part on the first code value, the second code value, and the third code value.

Aspect 29: A UE for wireless communication, comprising one or more memories storing processor-executable code, and one or more processors coupled with the one or more memories and individually or collectively operable to execute the code to cause the UE to perform a method of any of aspects 1 through 15.

Aspect 30: A UE for wireless communication, comprising at least one means for performing a method of any of aspects 1 through 15.

Aspect 31: A non-transitory computer-readable medium storing code for wireless communication, the code comprising instructions executable by a processor to perform a method of any of aspects 1 through 15.

Aspect 32: A network entity for wireless communication, comprising one or more memories storing processor-executable code, and one or more processors coupled with the one or more memories and individually or collectively operable to execute the code to cause the network entity to perform a method of any of aspects 16 through 28.

Aspect 33: A network entity for wireless communication, comprising at least one means for performing a method of any of aspects 16 through 28.

Aspect 34: A non-transitory computer-readable medium storing code for wireless communication, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a first set of one or more signals and a second set of one or more signals, the first set of one or more signals indicating a first code value associated with a physical cell identifier (PCI), and the second set of one or more signals indicating a second code value associated with the PCI;
receive, based at least in part on the first code value and the second code value, a third set of one or more signals indicating a third code value associated with the PCI; and
communicate one or more wireless communications with a first cell according to a physical cell identity of the first cell, wherein the physical cell identity is jointly encoded by the first code value, the second code value, and the third code value.

2. The UE of claim 1, wherein, to receive the third set of one or more signals, the one or more processors are individually or collectively further operable to execute the code to cause the UE to:
monitor for the third set of one or more signals based at least in part on the first code value being within a first subset of values of a set of first code values and on the second code value being within a second subset of values of a set of second code values.

3. The UE of claim 1, wherein the one or more processors are individually or collectively operable to cause the UE to receive the first set of one or more signals and the second set of one or more signals from a second cell different from the first cell.

4. The UE of claim 3, wherein the one or more processors are individually or collectively operable to cause the UE to receive the third set of one or more signals from the first cell.

5. The UE of claim 4, wherein the one or more processors are individually or collectively further operable to execute the code to cause the UE to:
receive, from the second cell, a message including assistance information for reception of the third set of one or more signals from the first cell, wherein receiving the third set of one or more signals from the first cell is based at least in part on the assistance information.

6. The UE of claim 4, wherein the one or more processors are individually or collectively operable to cause the UE to receive the first set of one or more signals and the second set of one or more signals via a first frequency within a frequency bandwidth indicated by a synchronization raster, and to receive the third set of one or more signals via a second frequency within the frequency bandwidth indicated by the synchronization raster.

7. The UE of claim 3, wherein the one or more processors are individually or collectively further operable to execute the code to cause the UE to:
receive, from the second cell, system information associated with the first cell.

8. The UE of claim 1, wherein the one or more processors are individually or collectively further operable to execute the code to cause the UE to:
receive a fourth set of one or more signals indicating a fourth code value associated with the PCI based at least in part on the first code value, the second code value, and the third code value, wherein communicating the one or more wireless communications with the first cell according to the physical cell identity of the first cell is further based at least in part on the fourth code value.

9. The UE of claim 8, wherein the one or more processors are individually or collectively operable to cause the UE to receive the fourth set of one or more signals based at least in part on the third code value being within a third subset of values of a set of third code values.

10. The UE of claim 1, wherein the first set of one or more signals, the second set of one or more signals, or both, indicate assistance information for reception of the third set of one or more signals.

11. The UE of claim 10, wherein the assistance information indicates a frequency location for reception of the third set of one or more signals based at least in part on a frequency offset from a center frequency associated with reception of the first set of one or more signals and the second set of one or more signals.

12. The UE of claim 10, wherein the one or more processors are individually or collectively operable to cause the UE to receive the first set of one or more signals and the second set of one or more signals via a first frequency within a frequency bandwidth indicated by a synchronization raster, and to receive the third set of one or more signals via a second frequency outside of the frequency bandwidth indicated by the synchronization raster based at least in part on the assistance information.

13. The UE of claim 1, wherein the one or more processors are individually or collectively further operable to execute the code to cause the UE to:
decode a master information block associated with communications with the first cell based at least in part on receiving the first code value, the second code value, and the third code value, wherein communicating one or more wireless communications with a first cell is based at least in part on successfully decoding the master information block.

14. The UE of claim 1, wherein the one or more processors are individually or collectively further operable to execute the code to cause the UE to:
decode a master information block associated with communications with the first cell based at least in part on receiving the first code value and the second code value, wherein receiving the third set of one or more signals is based at least in part on successfully decoding the master information block.

15. The UE of claim 1, wherein the one or more processors are individually or collectively further operable to execute the code to cause the UE to:
receive, form the first cell, a demodulation reference signal based at least in part on the first code value, the second code value, and the third code value.

16. A network entity, comprising:
one or more memories storing processor-executable code; and
one or more processors coupled with the one or more memories and individually or collectively operable to execute the code to cause the network entity to:
transmit a first set of one or more signals and a second set of one or more signals, the first set of one or more signals indicating a first code value associated with a physical cell identifier (PCI), and the second set of one or more signals indicating a second code value associated with the PCI;

transmit, based at least in part on the first code value and the second code value, a third set of one or more signals indicating a third code value associated with the PCI; and communicate, via a first cell, one or more wireless communications with a user equipment (UE) accord to a physical cell identity of the first cell, wherein the physical cell identity is jointly encoded by the first code value, the second code value, and the third code value.

17. The network entity of claim 16, wherein the one or more processors are individually or collectively further operable to execute the code to cause the network entity to:

transmit the third set of one or more signals based at least in part on the first code value being within a first subset of values of a set of first code values and on the second code value being within a second subset of values of a set of second code values.

18. The network entity of claim 16, wherein the one or more processors are individually or collectively operable to cause the network entity to transmit the first set of one or more signals and the second set of one or more signals via a second cell different from the first cell.

19. The network entity of claim 18, wherein the one or more processors are individually or collectively operable to cause the network entity to transmit the third set of one or more signals via the first cell.

20. The network entity of claim 19, wherein the one or more processors are individually or collectively further operable to execute the code to cause the network entity to:

transmit, via the second cell, a message including assistance information for reception of the third set of one or more signals from the first cell, wherein transmitting the third set of one or more signals from the first cell is in accordance with the assistance information.

21. The network entity of claim 19, wherein the one or more processors are individually or collectively operable to cause the network entity to transmit the first set of one or more signals and the second set of one or more signals via a first frequency within a frequency bandwidth indicated by a synchronization raster, and to transmit the third set of one or more signals via a second frequency within the frequency bandwidth indicated by the synchronization raster.

22. The network entity of claim 18, wherein the one or more processors are individually or collectively further operable to execute the code to cause the network entity to:

transmit, via the second cell, system information associated with the first cell.

23. The network entity of claim 16, wherein the one or more processors are individually or collectively further operable to execute the code to cause the network entity to:

transmit a fourth set of one or more signals indicating a fourth code value associated with the PCI based at least in part on the first code value, the second code value, and the third code value, wherein communicating the one or more wireless communications with the first cell according to the physical cell identity of the first cell is further based at least in part on the fourth code value.

24. The network entity of claim 23, wherein the one or more processors are individually or collectively operable to cause the network entity to transmit the fourth set of one or more signals further based at least in part on the third code value being within a third subset of values of a set of third code values.

25. The network entity of claim 16, wherein the first set of one or more signals, the second set of one or more signals, or both, indicate assistance information for reception of the third set of one or more signals.

26. The network entity of claim 25, wherein the assistance information indicates a frequency location for reception of the third set of one or more signals based at least in part on a frequency offset from a center frequency associated with reception of the first set of one or more signals and the second set of one or more signals.

27. The network entity of claim 25, wherein the one or more processors are individually or collectively operable to cause the network entity to transmit the first set of one or more signals and the second set of one or more signals via a first frequency within a frequency bandwidth indicated by a synchronization raster, and to transmit the third set of one or more signals is transmitted via a second frequency outside of the frequency bandwidth indicated by the synchronization raster.

28. The network entity of claim 16, wherein the one or more processors are individually or collectively further operable to execute the code to cause the network entity to:

transmit, via the first cell, a demodulation reference signal based at least in part on the first code value, the second code value, and the third code value.

29. A method for wireless communication by a user equipment (UE), comprising:

receiving a first set of one or more signals and a second set of one or more signals, the first set of one or more signals indicating a first code value associated with a physical cell identifier (PCI), and the second set of one or more signals indicating a second code value associated with the PCI;

receiving, based at least in part on the first code value and the second code value, a third set of one or more signals indicating a third code value associated with the PCI; and communicating one or more wireless communications with a first cell according to a physical cell identity of the first cell, wherein the physical cell identity is jointly encoded by the first code value, the second code value, and the third code value.

30. A method for wireless communication by a network entity, comprising:

transmitting a first set of one or more signals and a second set of one or more signals, the first set of one or more signals indicating a first code value associated with a physical cell identifier (PCI), and the second set of one or more signals indicating a second code value associated with the PCI;

transmitting, based at least in part on the first code value and the second code value, a third set of one or more signals indicating a third code value associated with the PCI; and communicating, via a first cell, one or more wireless communications with a user equipment (UE) according to a physical cell identity of the first cell, wherein the physical cell identity is jointly encoded by the first code value, the second code value, and the third code value.

* * * * *